(12) United States Patent
Kleinikkink et al.

(10) Patent No.: US 11,718,488 B2
(45) Date of Patent: Aug. 8, 2023

(54) LINEAR MOTOR CONVEYOR SYSTEM WITH DIVERTER AND METHOD FOR DESIGN AND CONFIGURATION THEREOF

(71) Applicant: ATS AUTOMATION TOOLING SYSTEMS INC., Cambridge (CA)

(72) Inventors: Albert Kleinikkink, Cambridge (CA); Roger Hogan, Cambridge (CA)

(73) Assignee: ATS CORPORATION, Cambridge (CA)

( * ) Notice: Subject to any disclaimer, the term of this patent is extended or adjusted under 35 U.S.C. 154(b) by 60 days.

(21) Appl. No.: 17/388,619

(22) Filed: Jul. 29, 2021

(65) Prior Publication Data

US 2021/0354935 A1 Nov. 18, 2021

Related U.S. Application Data

(63) Continuation of application No. 16/561,874, filed on Sep. 5, 2019, now Pat. No. 11,117,758, which is a
(Continued)

(51) Int. Cl.
*B65G 54/02* (2006.01)
*H02K 7/08* (2006.01)
(Continued)

(52) U.S. Cl.
CPC .............. *B65G 54/02* (2013.01); *H02K 7/08* (2013.01); *H02K 11/0141* (2020.08); *H02K 41/031* (2013.01)

(58) Field of Classification Search
CPC ........ B65G 54/02; H02K 11/141; H02K 7/08; H02K 1/031
See application file for complete search history.

(56) References Cited

U.S. PATENT DOCUMENTS 3,376,578 A * 4/1968 Sawyer .................. H02K 41/03
318/135
3,784,942 A * 1/1974 Eggert .................. B61B 10/005
335/206
(Continued)

FOREIGN PATENT DOCUMENTS

GB 1247257 A 9/1971
WO 2015042409 A1 3/2015

OTHER PUBLICATIONS

ノーウィッキ, アンソニー ジェイ, et al., Fall Protection and Guidance Sensor for Connection with Status and Control, JP2021512724, May 20, 2021 (see office action for pertinent pages) (Year: 2021).*
(Continued)

*Primary Examiner* — Gene O Crawford
*Assistant Examiner* — Lester Rushin, III
(74) *Attorney, Agent, or Firm* — Amarok IP Inc.; Neil W. Henderson

(57) ABSTRACT

A linear motor conveyor system having a moving element including a first and a second magnetic element on opposite sides; a first track including a first linear motor configured to generate a dynamic magnetic field which acts on the first magnetic element to provide a first lateral force and a first longitudinal force; a second track with a transfer region positioned adjacent to the first track, the second track configured to generate a magnetic field that acts on the second magnetic element to provide a second lateral force; and a controller to control the first linear motor such that the first dynamic lateral force is configured to bias the moving element toward the first linear motor until the moving element reaches a switch point in the transfer region, where the first and second lateral forces are selectively adjusted to bias the moving element toward the second track.

16 Claims, 15 Drawing Sheets

Related U.S. Application Data continuation of application No. PCT/CA2018/050263, filed on Mar. 6, 2018.

(60) Provisional application No. 62/467,357, filed on Mar. 6, 2017.

(51) Int. Cl.
 *H02K 41/03* (2006.01)
 *H02K 11/01* (2016.01)

(56) References Cited

U.S. PATENT DOCUMENTS

| | | | |
|---|---|---|---|
| 3,845,720 A | 11/1974 | Bohn et al. | |
| 5,492,066 A | 2/1996 | Nozaki et al. | |
| 9,246,377 B2* | 1/2016 | Fukasawa | H01L 21/6776 |
| 9,617,089 B2 | 4/2017 | Josefowitz et al. | |
| 10,636,687 B2 | 4/2020 | Lau et al. | |
| 10,643,875 B2 | 5/2020 | Burkhard et al. | |
| 10,917,027 B2* | 2/2021 | Weber | H02P 21/12 |
| 2007/0044676 A1* | 3/2007 | Clark | B61B 13/08 |
| | | | 104/130.02 |
| 2011/0100252 A1 | 5/2011 | Fukukawa | |
| 2015/0303090 A1 | 10/2015 | Lindenberg | |
| 2016/0380562 A1 | 12/2016 | Weber et al. | |

OTHER PUBLICATIONS

Canadian Intellectual Property Office as ISA, International Preliminary Report on Patentability for PCT/CA2018/050263, dated Sep. 10, 2019.

Canadian Intellectual Property Office as ISA, International Search Report for PCT/CA2018/050263, dated May 18, 2018.

European Patent Office, Extended European Search Report, corresponding application No. 18763051.2-1017/3458390 PCT/CA2018050263, dated Jun. 29, 2020.

State Intellectual Property Office of China, First Office Action for Application No. 201880023977.1, dated Nov. 4, 2020.

* cited by examiner

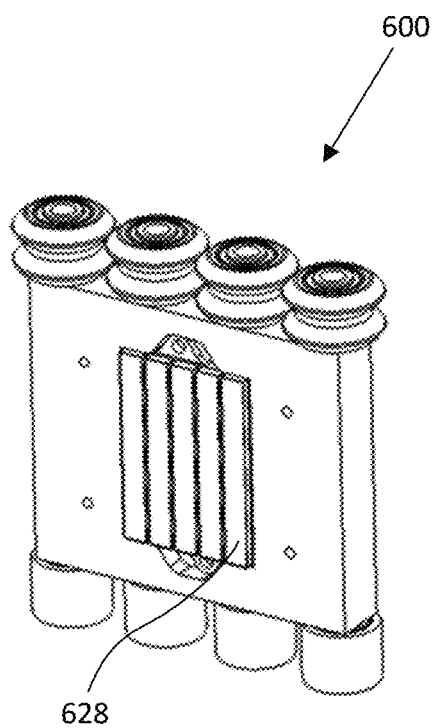
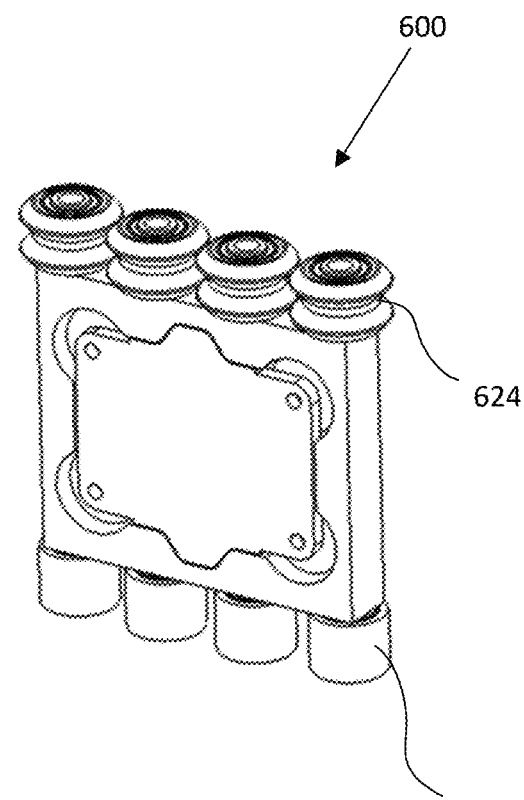
FIG 8A  FIG 8B
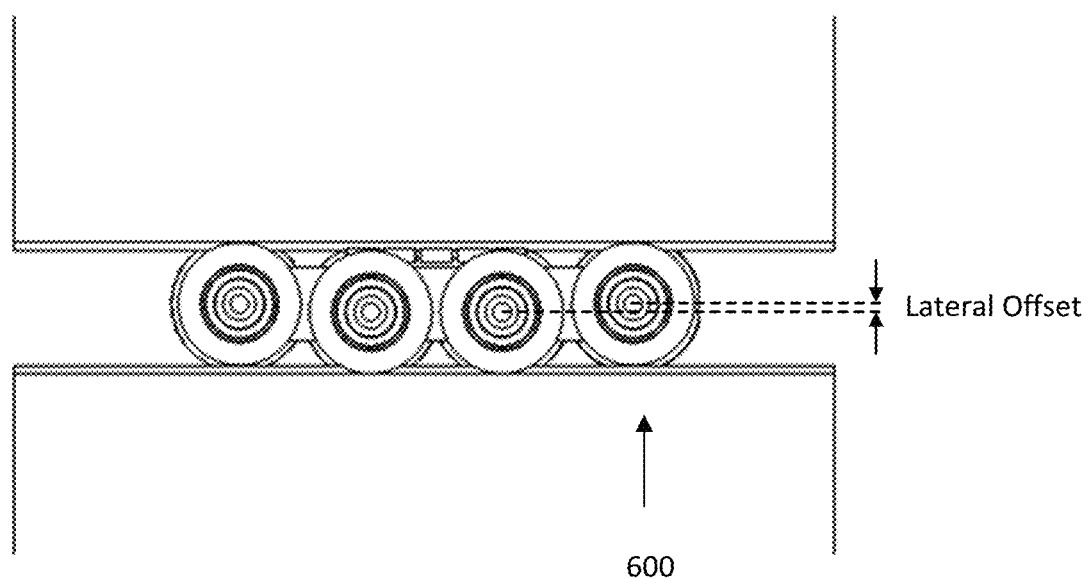
FIG 8C

LINEAR MOTOR CONVEYOR SYSTEM WITH DIVERTER AND METHOD FOR DESIGN AND CONFIGURATION THEREOF

RELATED APPLICATIONS

The application is a continuation of U.S. patent application Ser. No. 16/561,874, filed May 9, 2019, which is a continuation of PCT Application No. PCT/CA2018/050263, filed Mar. 6, 2018, which claims priority to U.S. Patent Application No. 62/467,357, filed Mar. 6, 2017, which are hereby incorporated herein by reference.

FIELD

The present disclosure relates generally to a conveyor system and bearing system for supporting moving elements thereon and, more particularly, a conveyor system having a transfer or divert section for branching, merging, diverting, or otherwise transferring moving elements from one track to another track.

BACKGROUND

In conventional linear motor systems, a moving element is controlled to move along a track by electromotive force. In a moving magnet linear motor, the moving element generally includes a permanent magnet and the track includes an electromagnetic field generator. The moving element is placed on the track such that the magnet is acted on by the electromagnetic field in order to move the moving element along the track. In some cases, the moving element may have bearings which run along the track and the moving element is supported by guides or guide rails or the like on the track. The guide rails may, for example, engage with the bearings or with the moving element itself. The bearings may include plain bearings, ball bearings, needle bearings, roller bearings, wheel bearings and the like.

In linear motor systems, forces, including acceleration, on the moving element can be high in order to move or stop the moving element quickly in order to increase production speeds. In this environment, the moving element may require larger or enclosing guide rails to help to counteract the forces. It is generally important that the moving element maintain an accurate, stable trajectory without unintentionally separating from the track. As such, in conventional systems, it can be difficult to remove, divert, branch or transfer off the moving elements from the track either because of the forces of magnetic attraction, or because of bearing engagement with the track or enclosing guide rails.

In conveyor systems and, in particular, linear motor conveyor systems, conventional bearings may have difficulty in achieving high precision, accurate, and repeatable movement along the direction of motion. Factors that may cause variability in precision include i) component manufacturing tolerances, ii) backlash or play (e.g. the clearance caused by gaps between components or parts), iii) how well the bearings are seated on the guide rail datum surfaces, and iv) the accuracy of the moving element position measuring system. Further, in some cases, conventional bearings may have specific parallelism tolerances and may be prone to binding during movement. Still further, conventional bearings often need to be preloaded by preloading hardware and have preloading adjustments to ensure the bearings stay in positive contact with the guide rails.

In some conventional bearing systems, as noted above, guide rails are provided to physically engage with either the moving element or the bearings in order to provide stability. These conventional bearing systems typically require mechanical disassembly of either or all of the moving element, the bearings, or the guide rails in order to remove the moving element from the track. These types of systems may also require preloading or tight manufacturing tolerances on the guide rails and bearings in order to achieve precise movement and positioning and avoid binding.

In such an environment, it can be difficult to provide a linear motor system that allows for track transferring, branching or diverting of moving elements from one track to another. As such, there is a need for a linear motor conveyor that provides transferring/branching/diverting that overcomes at least one problem with conventional systems.

It is a therefore desirable to provide a conveyor system with the ability to divert moving elements and provide moving elements for use therefore.

SUMMARY

According to one aspect herein, there is provided a linear motor conveyor system having a moving element comprising a first magnetic element on a first side and a second magnetic element on a second side, opposite to the first side; a first track comprising a first linear motor, the first linear motor configured to generate a dynamic magnetic field which acts on the first magnetic element to provide both a first dynamic lateral force and a first dynamic longitudinal force on the moving element; a second track with at least a transfer region of the second track positioned adjacent the first track, the second track configured to generate a magnetic field that acts on the second magnetic element to provide a second lateral force on the moving element; and a controller to control at least the first linear motor such that the first dynamic lateral force from the first linear motor and the second lateral force from the second track are configured to bias the moving element toward the first linear motor until the moving element reaches a switch point in the transfer region, after which the dynamic lateral forces are selectively adjusted to bias the moving element toward the first track or the second track.

In some cases, the first track may include a first magnetic material which acts on the first magnetic element to provide a first static lateral force in addition to the first dynamic lateral force, wherein the controller adjusts the lateral force in addition to the first dynamic lateral force.

In some cases, the second track may include a second magnetic material which acts on the second magnetic element to provide a second static lateral force, and wherein the controller selectively adjusts the first dynamic lateral force to bias the moving element toward the first track or the second track by overcoming net static forces from the first and second static lateral forces.

In some cases, the first static lateral force may be set based on a first magnetic gap between the moving element and the first linear motor, and the second static lateral force is set based on a second magnetic gap between the moving element and the second linear motor.

In some cases, the second track may include a second linear motor.

In some cases, the second magnetic element on the second side of the moving element may be a ferromagnetic element.

In some cases, the second track may include at least one permanent magnet and the first longitudinal force is configured to propel the moving element along the second track while held to the second track by the lateral forces of the at least one permanent magnet.

In some cases, the second track may include at least one electromagnet and the first longitudinal force is configured to propel the moving element along the second track while held to the second track by the lateral forces of the at least one electromagnet.

In some cases, the second track may include a curved track section with an integrated straight profile.

In some cases, the moving element further may include a stabilizer configured to reduce rotation of the moving element.

In some cases, the moving element further may include at least one cover for at least one of the magnetic elements to shield the magnetic field.

In another aspect there is provide a linear motor conveyor system including: a first track comprising a first linear motor; a second track comprising a second linear motor with at least a predetermined portion of the second track positioned adjacent the first track; a moving element comprising a first magnetic element on a first side and a second magnetic element on a second side, opposite to the first side, wherein the first magnetic element and first track are configured such that the moving element is biased toward the first track by a first lateral force and moved along the first track by a first longitudinal force; and a controller to control the first and second linear motors such that the second linear motor generates a second longitudinal force on the second magnetic element and any second lateral force generated by the second linear motor that is less than the first lateral force, wherein the second linear motor is configured to provide increased thrust to the moving element.

In some cases, the moving element further may include a stabilizer configured to reduce rotation of by the moving element.

In yet another aspect, there is provided a linear motor conveyor system including: a moving element comprising at least one magnetic element; a first track comprising a first linear motor, the first linear motor configured to have a first predetermined magnetic gap between the first linear motor and the moving element; a second track having at least a transfer region positioned adjacent the first track such that the moving element has a second predetermined magnetic gap between the second track and the moving element; and a controller to control the first linear motor such that, in the transfer region, the first linear motor can be selectively adjusted to generate a lateral magnetic force that overcomes the difference in magnetic gap and the moving element is biased toward either the first track or the second track.

In some cases, the second predetermined magnetic gap may be different from the first magnetic gap.

In some cases, the second track may include a second linear motor.

In some cases, the moving element may include a first magnetic element on a first side and a second magnetic element on a second side, opposite to the first side.

In some cases, the second magnetic element on the second side may be a ferromagnetic element.

In some cases, the second track may include at least one permanent magnet and the first linear motor is configured to provide sufficient longitudinal force to propel the moving element along the second track while held to the second track by the lateral forces of the at least one permanent magnet.

In some cases, the second track may include at least one electromagnet and the first longitudinal force is configured to propel the moving element along the second track while held to the second track by the lateral forces of the at least one electromagnet.

In some cases, the second track may have a curved track section with an integrated straight profile.

In some cases, the moving element may further include a stabilizer configured to reduce rotation of the moving element.

In some cases, the moving element may further include at least one cover for at least one of the magnetic elements to shield the magnetic field.

In still yet another aspect, there is provided a moving element for a linear motor conveyor system, the moving element including: at least one magnetic element having a magnetically calibrated position in relation to the moving element and configured to interact with both a first linear motor on a first track and a magnetic field associated with a second track.

In some cases, the moving element may include a magnet positioning device for adjusting position of the magnetic element.

In some cases, the at least one magnetic element may include a first magnetic element on a first side and a second magnetic element on a second side, opposite to the first side.

In some cases, the second magnetic element on the second side may be a ferromagnetic element.

In some cases, the moving element may include a stabilizer configured to reduce rotation of the moving element.

In some cases, the moving element may include at least one cover for at least one of the magnetic elements to shield the magnetic field.

In another aspect, there is provided a setup tool for a linear motor conveyor system, the setup tool including: a body; a magnetic element provided to the body; a load cell connected to the magnetic element and configured to sense the forces acting on the magnetic element; and a controller for reading data sensed by the load cell.

In some cases, the setup tool may include bearings provided to the body and configured to interact with rails on the linear motor conveyor.

In yet another aspect, there is provided a method of configuring a diverter on a linear motor conveyor system, the method including: physically mounting a first linear motor track adjacent a second track at a predetermined distance; determining the magnetic forces on a setup tool placed between the adjacent tracks; and adjusting a magnetic set point for each of the first and second tracks based on the determined magnetic forces to allow a moving element to be diverted from the first track to the second track.

In still yet another aspect, there is provided a method of designing a linear motor conveyor system, the method including: determining the dimensions of at least a straight section and an orthogonal section of track; creating a grid based on the determined dimensions; and configuring the linear motor conveyor system on the grid such that the moving elements are placed on the grid lines.

In some cases, the method of designing a linear motor conveyor system may further include determining dimensions of a 180-degree curved section that fits on the grid.

Other aspects and features of the present disclosure will become apparent to those ordinarily skilled in the art upon review of the following description of specific embodiments in conjunction with the accompanying figures.

BRIEF DESCRIPTION OF FIGURES

Embodiments of the present disclosure will now be described, by way of example only, with reference to the attached Figures.

FIGS. 8A and 8B illustrate a setup tool for use in a conveyor system with a divert section according to an embodiment;

FIG. 8C illustrates an overhead view of the setup tool when used in a conveyor system according to an embodiment;

DETAILED DESCRIPTION

Generally, the present disclosure relates to a conveyor system with a transferring, branching or divert function and a moving element therefor.

As noted above, conventional bearings on traditional moving elements are often engaged onto a guide rail or track and require disassembly to be removed from the linear conveyor system. These traditional moving elements are generally unable to be reliably diverted because of this engagement. Further, most linear motor conveyors make use of strong magnetic attraction in addition to having engaged bearing systems in order to have better control over the motion of the moving element. Overcoming the magnetic attraction while having the moving element remain stable and in contact with the guide rail or track has been shown to be difficult using conventional methods unless wheel encapsulation or other similar additional support is provided to the moving element. As such, generally, it is difficult to provide a divert function on a conventional linear motor conveyor system. Even if it could be implemented, such a divert function would typically require significant additional parts, such as mechanical parts or the like, which may become costly, take more space, reduce reliability and constrain the flexibility of the conveyor system.

Figure 1:
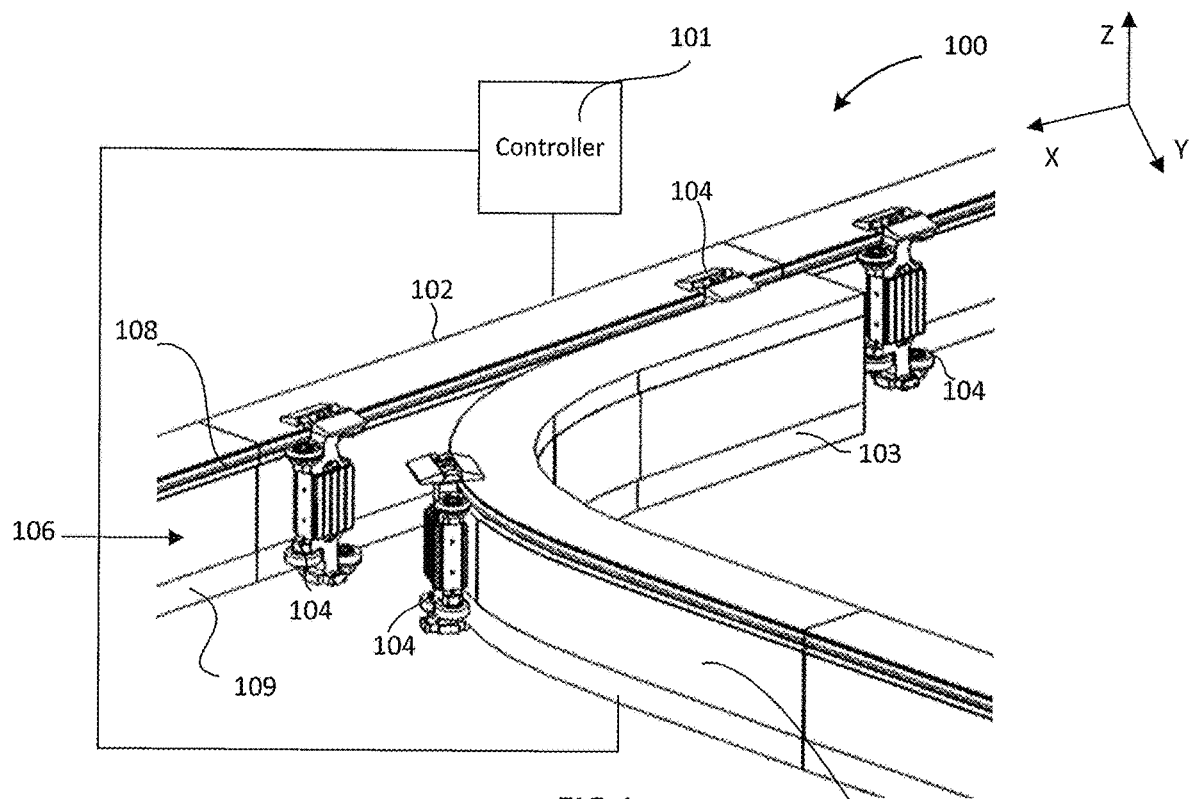
FIG. 1 illustrates a conveyor with a divert or transfer section according to an embodiment.

FIG. 1 illustrates a conveyor system 100 having a track section 102 and a divert section 103 adjacent to the track section 102 (e.g. so that the sections 102, 103 are laterally opposite to each other). In this document, the term "track section" refers to a portion of track that may either be a stand-alone module or may be a part of a longer track. The term "divert section" is used to refer to a track section onto which a moving element is diverted but it will be understood that moving elements can generally be diverted from any track section to any other track section on which there is sufficient room to provide the diverter system. The conveyor system includes one or more moving elements 104 (four are illustrated) which are configured to ride or travel along the track section or the divert section. Some of the principles of operation of a linear motor track section such as those described herein are included in more detail in U.S. Pat. No. 8,397,896 to Kleinikkink et al., which is hereby incorporated herein by reference.

As noted above, the conveyor system 100 can be composed of a plurality of track sections 102 which are mechanically self-contained and separable from one another so as to be modular in nature. In this embodiment, the track sections 102 are mounted on a support (not shown) so as to align and abut one another in order to form a longer track. In order to be modular, each track section 102 may house self-contained electronic circuitry for powering and controlling the track section 102. The conveyor system 100 may include curved track sections and curved divert sections.

In FIG. 1, the track section includes a drive motor or element that produces a dynamic magnetic force for moving the moving element 104 along the track section. The dynamic magnetic force can also assist with supporting the moving element 104 on the track section. Magnetic elements (such as an element generating a magnetic field, or an element attracted to a magnet, for example a ferromagnetic element or the like, for example, permanent magnets, electromagnetic coils, metal plates or the like) provided to the moving elements also hold/support the moving elements to the track due to the magnetic attraction of the permanent magnets to the track (for example, iron laminations within the motor and the like). For example, the track may be of ferromagnetic material configured to provide a static lateral force (sometimes referred to as passive lateral force) attracting the moving element toward the track. These static lateral forces are distinguished from the dynamic forces (e.g. forces generated between the moving element 104 and the electromagnetic coils of the drive motor). For instance, the static lateral force is present even if no electrical current is passed through the electromagnetic coils.

The dynamic magnetic force for moving the moving element is created by the interaction of the magnetic flux created by magnetic flux elements (for example, embedded coils) (not shown) of the track section and magnetic elements of the moving element 104. The dynamic magnetic force can be thought of as having a dynamic motive force component for directing movement of the moving element 104 along an X axis (direction of travel) on the track 106, and, in some cases, a dynamic capturing force component to hold, on a Y axis (laterally), the moving element 104 on the track 106. In practice, the dynamic motive force and the dynamic capturing force may be provided by the same magnetic flux elements in the track.

In this embodiment, the track section includes a first guide rail and a second guide rail configured to support the moving element 104. In one particular embodiment, the first guide rail 108 supports the moving element 104 vertically and horizontally. The first guide rail 108 may have at least one "V" shaped profile to support and guide the moving element 104 on the track 106. In some cases, the moving element may include offset bearings and the first guide rail may have two "V" shaped profiles to support and guide the moving element. The second guide rail 109 supports the moving element 104 horizontally. The second guide rail 109 may be a smooth surface with a flat profile.

The first and second guide rails are designed such that the moving element 104 may be removed/separated from the track section when the magnetic force is overcome. The magnetic force is overcome, for example, at a divert section 103 wherein the magnetic forces operating on the moving element are adjusted in one or both of the track section 102 and the divert section 103 such that the moving element transitions from the track section 102 to the divert section 103. It will be understood that the adjustment of the dynamic magnetic force may involve a change in the magnetic force (for example, a weakening) at the track section and/or a corresponding change (for example, a strengthening) in the magnetic force at the divert section over a predetermined distance of travel such that the moving element is released from the track section and retained/captured by the divert section. In this way, the moving element 104 can transition from the track section and continue on the divert section.

Figure 2A:
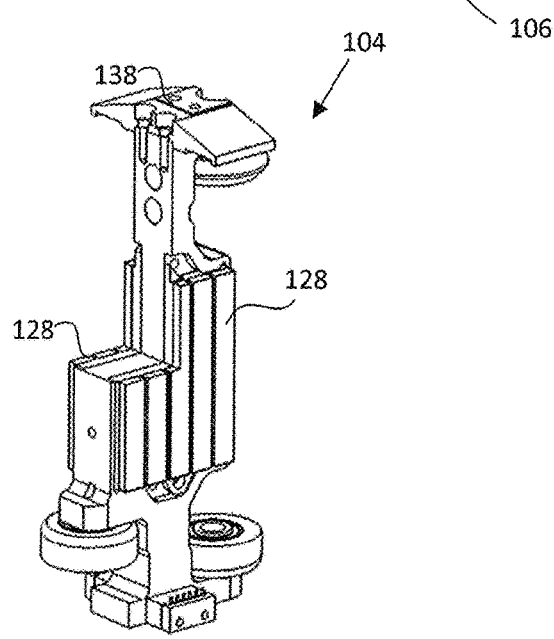
FIG. 2A illustrates a partial cross-section of a moving element for use in a conveyor with a divert section according to an embodiment.
Figure 2B:
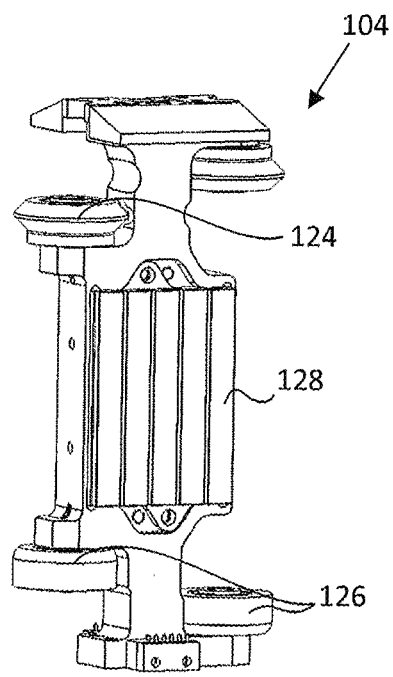
FIG. 2B illustrates the moving element of FIG. 2A without the partial cross-section.

FIGS. 2A and 2B shows an example embodiment of a moving element 104 that is provided with magnetic elements 128 located on either lateral side of the moving element (shown with a cut-away view to illustrate the magnetic elements on each side). In some cases, the magnetic elements 128 may provide a magnetic flux that corresponds to or interacts with the magnetic flux created by of the track section. In other cases, the magnetic elements 128 may be attracted to the magnetic flux created by the track section. In some embodiments, the magnetic elements 128 may be permanent magnets, in other embodiments the magnetic elements may be electromagnets, ferromagnetic elements, or the like. In some embodiments, having magnetic elements on either lateral side of the moving element may help allow the moving element to either divert to a divert section or to continue on a track section depending on the dynamic or static magnetic forces applied from the track section and/or divert section. The cumulative magnetic forces interacting with the magnetic elements 128 on either side of the moving element may provide for balancing the static lateral magnetic forces in order to enable diversion using the dynamic magnetic forces.

The moving elements may be held to the track by a magnetic force by for example a permanent magnet and the attraction to the ferromagnetic material of the track. These static magnetic forces can be quite large and may range from 100N to 4000N per moving element. The static magnetic forces are overcome in order to divert the moving element 104 between the track sections. Having magnetic elements 128 on either side of the moving element 104 may provide for balancing of the static forces which is intended to allow for diversion using dynamic magnetic forces, for example, via field strengthening and/or field weakening forces.

A controller (101 in FIG. 1), including a processor and memory, may be used to adjust the magnetic fields produced by the track section and divert section on the conveyor system to ensure that the moving element 104 is moved along the appropriate section. In some embodiments, there may be a single magnetic element, for example, embedded in the moving element between the two lateral sides, either at the center or offset.

As shown in FIGS. 2A and 2B, the moving element 104 has a first set of bearings 124 and a second set of bearings 126. In this embodiment, the first set of bearings 124 is located above the second set of bearings 126. The first and second set of bearings 124, 126 may be wheel bearings that are rotatably attached to the moving element 104.

The first set of bearings 124 rides on the first guide rail. The first set of bearings 124 has an edge profile that corresponds to the profile of the first guide rail. In an embodiment, the first set of bearings 124 has a "V" shaped profile that matches the opposite "V" shape profile of the first guide rail 108. In some cases, as shown in FIG. 2B, the bearings of the first set of bearings 124 may be offset and adapted to match a dual shaped first guide rail. In other cases, the bearings may be aligned. The first set of bearings 124 may alternately have a "U" shaped profile or another appropriately shaped profile. The shaped guide rails and bearings are intended to support the moving element 104 along a Z axis that is perpendicular to the X and Y axes (in this case, the vertical axis). In some cases, the moving element 104 has two bearings in the first set of bearings 124 but additional bearings may be included. In certain cases, the two bearings in the first set of bearings may be offset or in-line.

The second set of bearings 126 rides on a second guide rail. The second set of bearings 126 has an edge profile that corresponds to the profile of the second guide rail. In an embodiment, the second set of bearings 126 has a flat profile (e.g., a flat wheel) that matches the flat profile of the second guide rail. The second set of bearings 126 may roll within a range (slightly higher or lower) on the second guide rail to adapt to any non-parallelism with the first guide rail. In some cases, the second set of bearings 126 includes a plurality of bearings, for example, the set could include two or more flat wheels. In certain cases, the bearings within the second set of bearings may be offset from each other, for example, to allow overlap with another moving element or the like.

Higher precision may be achieved over conventional conveyors by supporting the moving element 104 with magnetic force and the first set of bearings 124 to control the moving elements 104 along the Y axis and the Z axis including position and rotation. In certain cases, the first set of bearings 124 maintains the moving element 104 along the Y axis and the Z axis and assists with controlling pitch rotation (about the Y axis) and yaw rotation (about the Z axis). The first set of bearings 124 is also intended to aid in precise movement and positioning along the X axis.

The second set of bearings 126 assist with controlling rotation of the moving element 104 about the X axis. The second set of bearings 126 may be positioned at a distance from the guide rail 108 to minimize variability due to rotation about the X axis that may be experienced by a pedestal 138 which supports a work surface. The bearings 126 and the guide rail 109 may have tight tolerances on the dimensions that impact rotation about X axis to allow precise positioning of the moving element 104.

Figure 3:
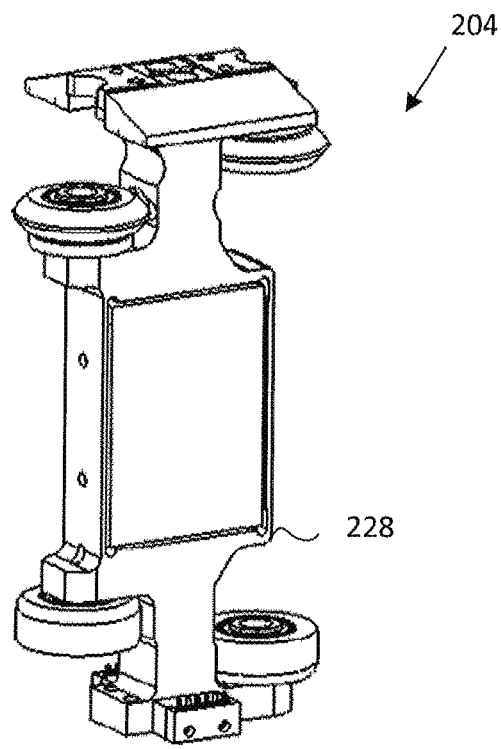
FIG. 3 illustrates another embodiment of a moving element.

FIG. 3 shows an alternative embodiment of a moving element 204 in which there is a single magnetic element 228 provided to the moving element. In this case, as with other embodiments, the magnetic element may be a permanent magnet, an array of permanent magnets, an electromagnet or the like. In this embodiment, the magnetic element is provided at a central portion of the moving element and may, in some cases, be mounted or may be internal to the body of the moving element. The moving element is configured such that the magnetic element can be acted on by either or both of the track section and the divert section from either side of the moving element. In some cases, the magnetic element may be offset by a predetermined amount to one side such that the moving element will be generally biased toward one side during movement. This may help to balance the magnetic forces during a transfer, for example a merge or divert between track sections.

It is intended that a divert section may be added anywhere along the linear motor without the need of additional magnets, coils, electronics or mechanical parts on the track section or the divert section to assist in the diversion of the moving element. The moving element may be low mass, compact and cost effective. As the moving elements 104, 204 have open, non-constrained bearings, the moving elements 104, 204 are intended to be free to pass from a track section to a divert section based on an adjustment in the magnetic field (static, dynamic, or both) on either or both of the track section and divert section as described herein.

Figure 4:
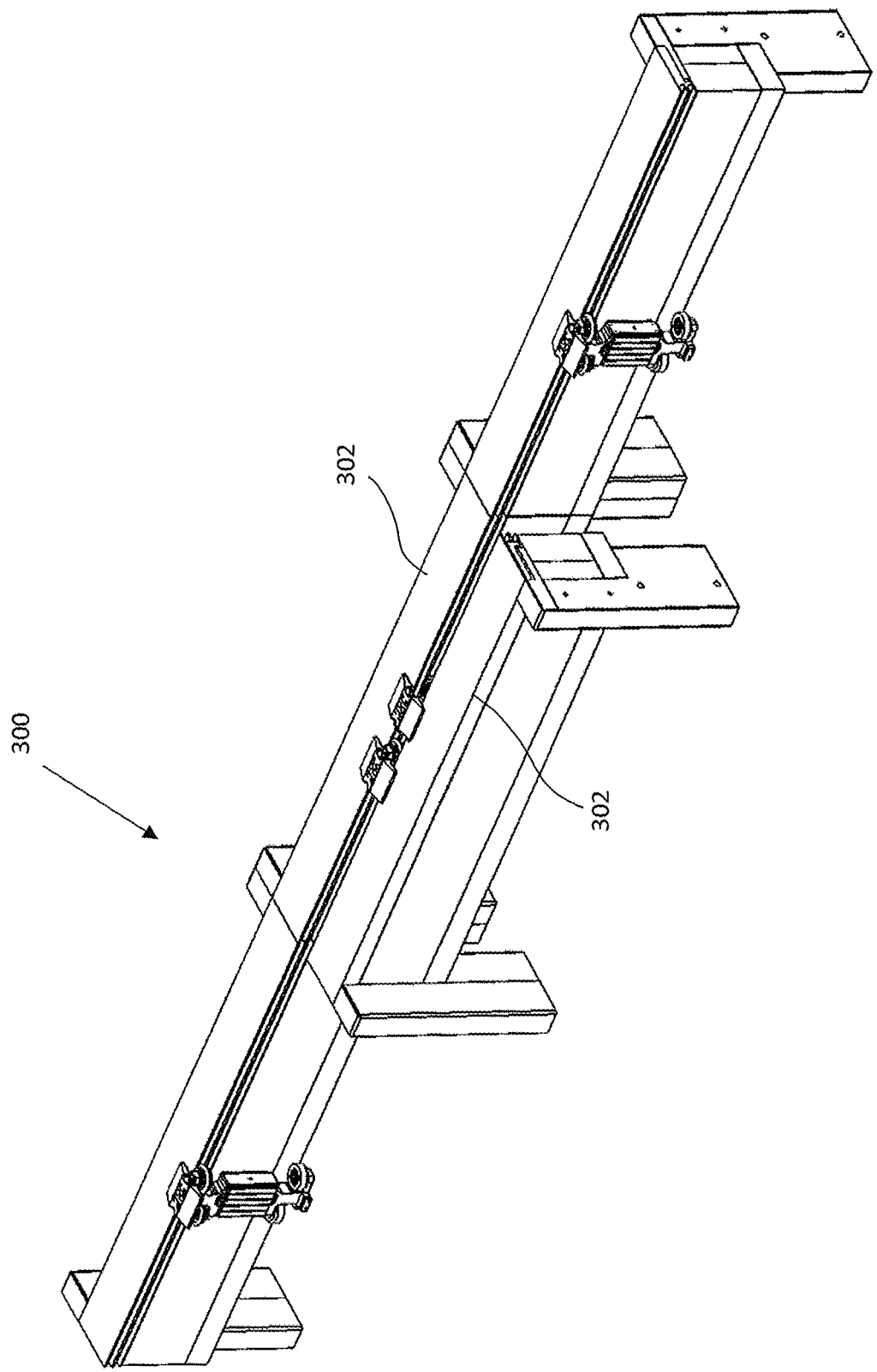
FIG. 4 illustrates an embodiment of a linear motor conveyor using two track sections to provide additional thrust to a moving element.

In some embodiments, as shown in FIG. 4, a linear motor conveyor system 300 may, instead of providing for a divert or in addition to a divert, use two track sections 302 arranged opposite each other to provide for a dual motor thrust to a moving element such as that shown in FIGS. 2 and 3. In particular, conveyor systems may have areas where high speed and high throughput is preferable, for example using the dual thrust with two opposing track sections, while other locations may require lower or slower performance, for example using a single track section. In some cases, it may be beneficial to provide an ability to increase thrust at predetermined locations along a linear motor conveyor system. The ability to increase thrust is intended to be cost effective and compact. In a particular embodiment using the moving element 104 which includes a magnetic element on either side of the body of the moving element, the conveyor system may include an additional linear motor that is configured to act on the second set of magnetic elements in regions where increased speed or throughput would be beneficial. In this situation, the track section providing the additional thrust may be configured such that there is a bigger gap between the motor and the magnetic element so that there is a lower lateral force pulling the moving element toward the additional thrust track section. Alternatively, the hardware or software controllers could reduce the lateral force from the additional thrust track section. Further, the additional thrust track section may be controlled such that forces are reduced as the moving element exits the additional thrust track section. In some embodiments, the two opposing track sections may be capable of providing thrust to a moving element having a single magnetic element.

Figure 5:
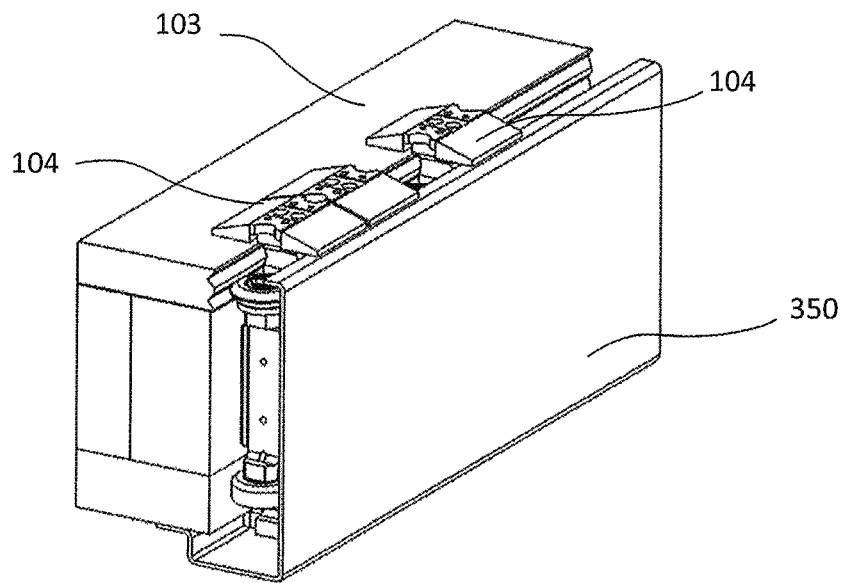
FIG. 5 illustrates a magnetic field protection system for use in a conveyor system according to an embodiment.

FIG. 5 illustrates a magnet cover for a conveyor system that can be used in a situation when additional magnetic fields (for example, from a second magnetic element on a back/opposite side of a moving element) are not required. As described herein, the moving element 104 may have dual magnets (one on each side of the moving element) for diversion and/or added thrust. In some regions of the track, the second set of magnetic elements may not be used but remain exposed. The second set of magnetic elements may continue to generate static magnetic fields that may be prone to attract magnetic materials or may otherwise become problematic for the travelling moving element. A magnetic cover 350 may be used to reduce the static magnetic fields that are being emitted from the moving element. The cover 350 may be attached to the moving element itself or, as shown in FIG. 5, attached to the conveyor system in regions that are not being used for diversion, for added thrust or the like. In some embodiments, the cover may be removable or may be adapted to be movable between a position where it is active (i.e. reducing the field) or inactive (i.e. not reducing the field in the same way).

Preferably, the cover would be kept at an appropriate distance from the magnetic elements in order to minimize drag and heat generation that may be created in the covered region. The cover may be a material that reduces the emitted magnetic field to a lower level beyond the cover 350. The cover 350 is intended to provide adequate coverage to reduce or prevent the risk of magnetic materials being attracted to, for example, the second set of magnetic elements on the moving element 104. In other cases, the cover may be of non-ferromagnetic material and may provide protection from external ferromagnetic materials attracting to the magnetic elements of the moving element.

In other cases, one of the magnetic elements may be a ferromagnetic plate while a magnetic element that generates a magnetic field may be used on the other side of the moving element. In some cases, a cover may not provide adequate coverage for the emitted magnetic field depending on, for example, the products being conveyed, the sterile or clean nature of the conveyor system, or the like. Using a ferromagnetic plate may allow for a lateral attraction force at a divert section without the additional emitted magnetic field provided by two magnetic elements. In this case, permanent magnets may be applied to, for example, corner divert locations, that may provide sufficient attraction forces to divert the moving element by attracting the ferromagnetic plate to the permanent magnets.

Figure 6:
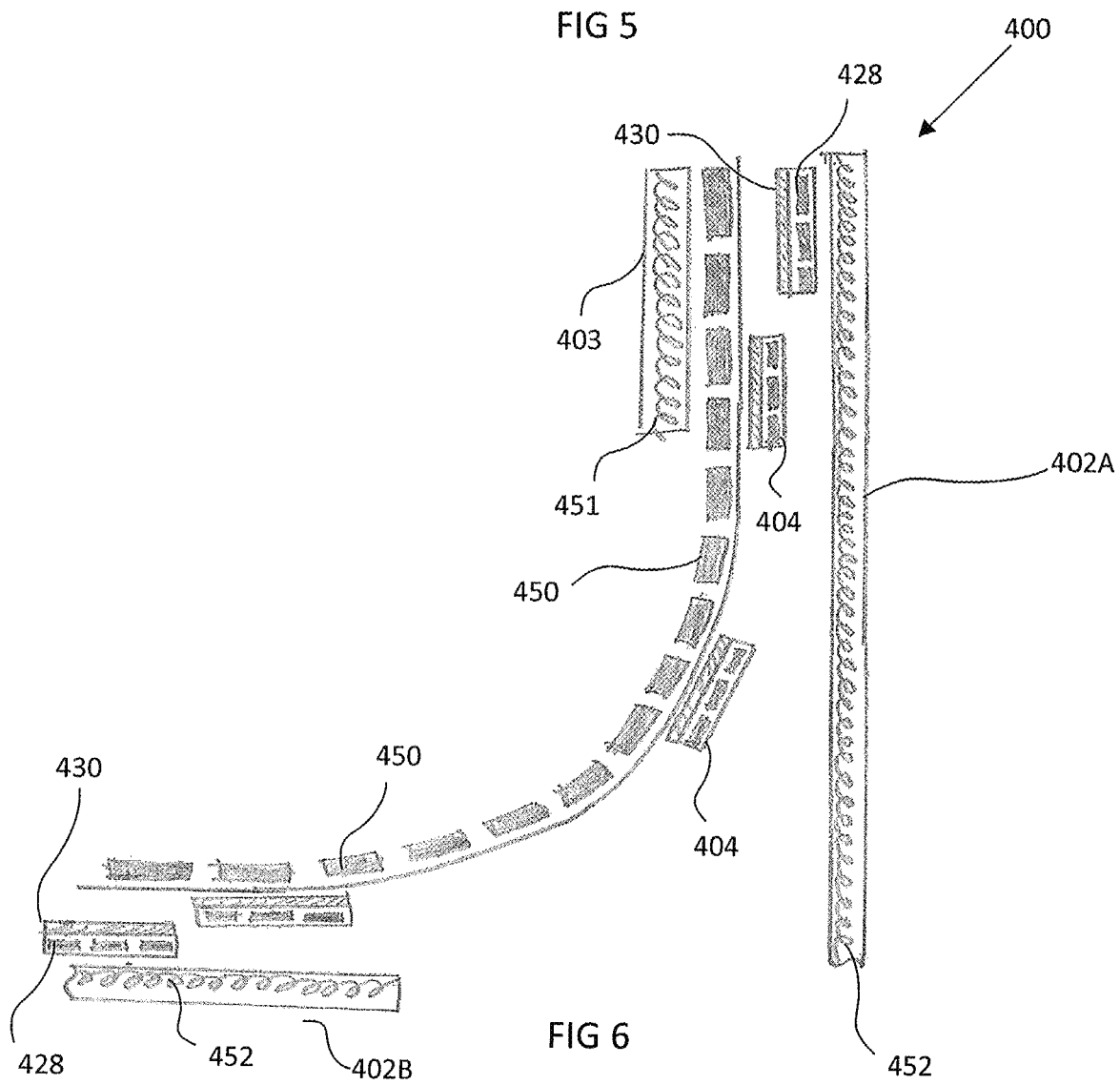
FIG. 6 illustrates a divert track section with permanent magnets according to an embodiment.

In an example, a biasing of the moving element may be accomplished by replacing the second set of magnetic elements with a ferromagnetic plate and having permanent magnets on a divert section guide rail, rather than electromagnetic coils. FIG. 6 illustrates conveyor system 400 having a curved divert track section 403 with permanent magnets 450 and/or with diverter/transfer coils 451 on the divert track section and a plurality of moving elements 404 with ferromagnetic plates 430 on one side and magnetic elements 428 on a reverse side. Two track sections 402A and 402B are also visible and include magnetic coils 452 which attract the magnetic elements 428 toward the track sections 402A and 402B, by, for example, dynamic lateral magnetic forces. By varying the strength and polarity produced by the magnetic coils 452 (and possibly coils 451), the moving elements are able to travel either by continuing on a first track section 402A or be diverted via the curved divert section 403 to the second track section 402B. In this case, the moving elements 404 can be seen travelling on a track section 402 and being biased toward the divert track section 403 via the attraction between a ferromagnetic plate 430 of the moving element 404 and the permanent magnets 450 and/or coils 451 of the divert section 403.

In some cases, the linear motor conveyor system may include a track section having a linear motor and a divert section having an electromagnet that may generate the lateral force for the diversion. In still other cases, a second magnetic field may be associated with a track and/or divert section to provide a further field strengthening or field weakening. For example, an external electromagnet or other magnetic element may be paired with a divert section or track section to provide for further forces (such as lateral forces) generated from the interaction of the moving element with the track and divert section.

Figure 7:
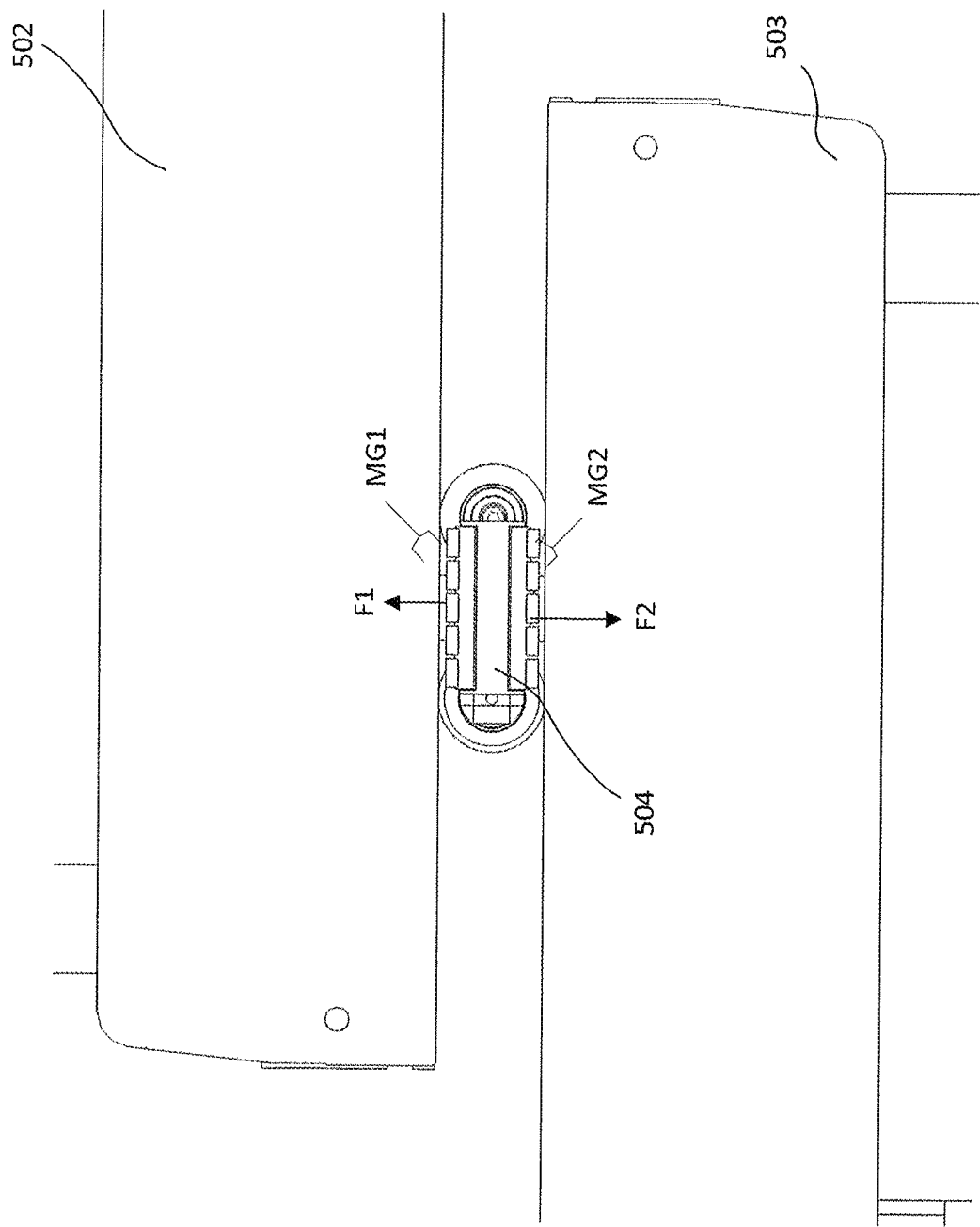
FIG. 7 illustrates a force diagram on a moving element in a conveyor system.

In some cases, diversion may be aided or accomplished by setting different magnetic gap sizes between the rails, which may help balance static magnetic forces or bias the moving element toward one rail. In an example shown in FIG. 7, a guide rail in a track section 502 may have a first magnetic gap (MG1), and a guide rail on a divert section 503 may have a second magnetic gap (MG2). The magnetic gaps may be defined by a combination of physical distances and cumulative magnetic forces. For instance, the physical size of the first magnetic gap MG1 might be greater than the second magnetic gap MG3 but the magnetic force of the second magnetic gap MG2 might be greater than the first magnetic gap MG1, which may result in equivalent magnetic gap sizes, as explained in further detail below.

In some embodiments, a difference in magnetic gap, as MG1 is less than MG2, can help bias a moving element 504 toward the first rail as a force F1 is intended to be sufficiently greater than a force F2 to bias the moving element toward the first rail. In a specific example, a force of 200N toward first rail minus 160N force toward second rail results in a 40N net bias force toward first rail. Adjusting the size of the gap and/or the force of the magnetic fields may bias the moving element in the desired path, for example to continue on the track section or divert to the divert section. In addition or alternatively, the size of the gap and/or the static force of the magnetic fields could help reduce the amount of dynamic magnetic force needed to divert the moving element between rails. In the example above, the dynamic magnetic force required to cause a diversion is on the order of 40N. If the second force of 160N were not present, then a 200N dynamic magnetic force would be required. In some cases, the first magnetic gap may be in a range of approximately 1 mm to 3 mm and the second magnetic gap may be approximately 0.1 mm to 1 mm different from the first magnetic gap.

It is worthwhile noting that the need to overcome static magnetic forces is more important when the moving elements are held on the rail with lateral magnetic forces. On systems with mechanical wheel encapsulation, there might be lower lateral magnetic forces, and, thus, the dynamic lateral magnetic forces required might already be relatively small In addition to the magnetic gap, otherwise referred to as a motor gap, there may also be a physical rail gap. The physical rail gap determines how far the wheels shift laterally. The magnetic gaps are intended to set the lateral magnetic forces and the resulting imbalance to be overcome in the case of diverting. Physical rail gap may be considered as a conventional mechanical adjustment which may be set prior to determining the magnetic gaps. The magnetic gaps are intended to be set independently of the physical rail gap to achieve a balanced magnetic force to accommodate diversion or the transferring of the moving elements.

In some cases, a setup tool 600 may be used to assist with setting up the moving elements so that magnetic tolerances for the conveyor system are set appropriately as described herein. An embodiment of a setup tool is shown in FIGS. 8A and 8B. As noted above, a conveyor system having a transfer/branching/divert option may be based on magnetic field strengthening and/or weakening which may require tight tolerances in the magnetic gaps as the moving element is transferred from one motor over to a receiving motor, for example when a moving element moves between a track section and a divert section. In this type of arrangement, multiple mechanical stack-up tolerances in both the moving element and the track may be combined into a resulting magnet gap tolerance (related to the distance between magnet and driving element). It can be costly to hold all parts to tight tolerances in order to achieve an appropriate magnet gap tolerance for efficient operation of the system. Further, it may also be difficult to align motors/driving elements at diversion points if the alignment tolerances are required to be very tight. Further, permanent magnets are known to have inherent variation in magnetic field strength which may add a further complication when dealing with moving elements having two magnetic elements or sets of magnetic elements.

It is intended that the manufacturing tolerances for both the conveyor system and the moving element are in a range that allow the parts to be cost effective to manufacture. It is also intended that the tolerances to align two driving elements/motors on a system for diversion are reasonable for ease of system assembly. In each moving element, the magnet or magnets are ideally adjusted to be aligned well enough that moving elements divert reliably in either direction, orientation and at any speed as controlled by the controller. In working with manufacturing tolerances, it was determined that, in some cases, it may be preferable to adjust or calibrate mechanical parts based on magnetic field strength versus manufacturing tolerances. In particular, it was determined that magnetic field strength may be considered a basis for reliable diversion based on the embodiments described herein. Overall, the following calibration processes may be referred to as calibrating the static magnetic forces between the moving elements and the track sections.

FIGS. 8A and 8B show an embodiment of a setup tool 600 that could be used to adjust the magnet gap at a diverter location based on magnetic field strength while FIG. 8C illustrates an overhead view of the setup tool 600 as it would appear between two track sections (for example, a track section and a divert section). This tool 600 has a magnetic element, such as a permanent magnet or a permanent magnet array (similar to the permanent magnet or magnet array on the moving element) that is attached to a load cell configured to measure force. This tool 600 is configured to be brought into position at a diverter location and moved through the divert area so that the permanent magnet/magnet array would interact with one of the motor stators in the conveyor system. Since the permanent magnet is attached to the load cell, the load cell is configured to report the actual magnetic attractive force, in one embodiment, on a display (not shown). The magnet gap can then be adjusted to achieve a predetermined magnetic force for reliable diversion by adjusting the settings for the track section and/or divert section accordingly. The setup tool 600 may then be rotated 180 degrees and the procedure repeated to set the gap for the opposing motor being used for diversion. Adjusting the two magnet gaps based on magnetic (e.g. attractive) force may be easier and more reliable that manufacturing or adjusting to precise manufacturing tolerances. In general, the manufacturing tolerances of all of the parts that contribute to magnet gap variability may not have to be held as tight in a situation where the magnet gaps can be adjusted based on magnetic force. This approach can also be used to at least somewhat compensate for variability in permanent magnet strength.

As shown in FIGS. 8A and 8B, it is intended that the setup tool include at least one shaped spacers such as bearing 624 and one flat spacer such as bearing 626 intended to correspond to the guide rails of the conveyor system. In general, the setup tool is intended to be similar to the format of a typical moving element as used on the conveyor system. It is intended that bearings may allow the setup tool 600 to conveniently roll and traverse the guide rails. While wheeled bearings are shown, the spacers could be machines profiles formed along the tool that correspond to the guide rails, in which case, the machined profiles may have low friction coatings such as Teflon™. In general, the setup tool is intended to be similar to the format of a typical moving element as used on the conveyor system.

Generally speaking, an example embodiment of a process to adjust the rail and the magnet/air gap at the same time could include the following processes and make use of an embodiment of a setup tool such as that described above.

First, the physical gap between the two track sections and the height of the rails for each of the track sections at a diversion point is set mechanically. In this embodiment, the setup tool has laterally offset wheels in order to set the physical spacing of the rails before setting the magnetic gap.

The setup tool is brought into the diversion location and the rails of each track section are adjusted to butt up against the wheels of the setup tool on both sides. In particular, the lateral wheel offset sets the physical gap between the rails. As noted, the height of the rails of each track section is also adjusted by ensuring the V-wheels of the setup tool are fully engaged on both sides and the top of the moving element is level.

With the setup tool located at the diversion location, the load cell of the setup tool will measure the magnetic attraction force to one of the two motors. This motor is then adjusted to achieve a set point force without moving the rails. The configuration profile may be stored in a hardware or software controller or in a memory therein or associated therewith. In this way, the motor/magnetic gap is based on a magnetic force, not a physical dimension.

The setup tool is then rotated 180 degrees and placed at the diversion location. The same step is then applied to the opposing motor to adjust the motor to achieve the appropriate set point magnetic force.

At this point, both the physical and magnetic gaps have been adjusted so diversions should function smoothly when passing from either motor to the other motor in either direction of travel.

Figures 9A, 9B:
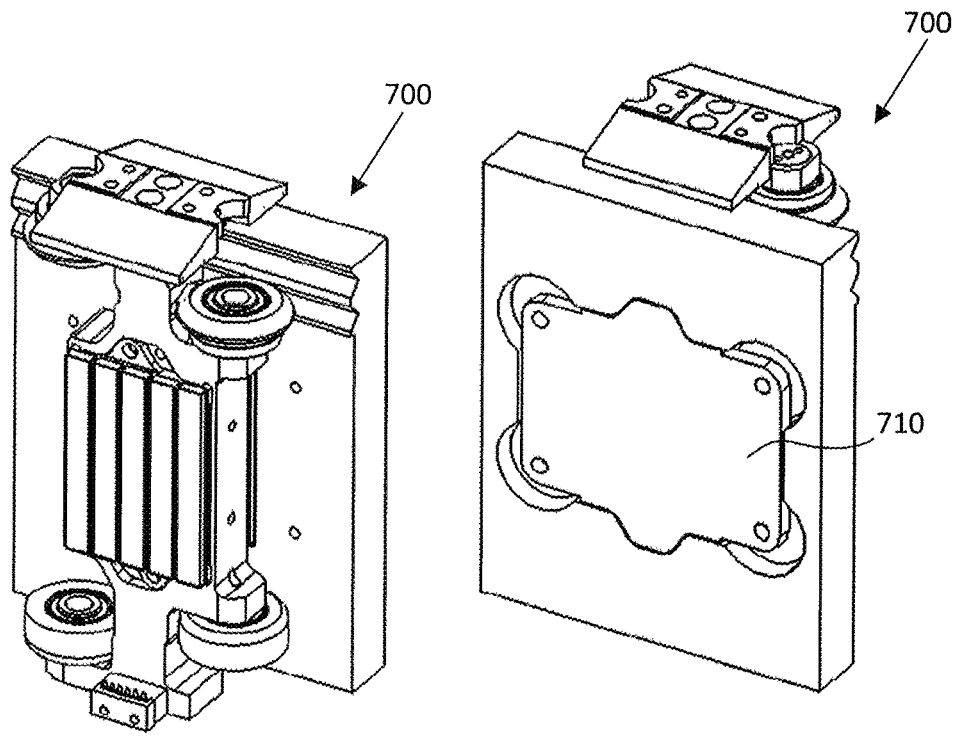
FIGS. 9A and 9B illustrate a front perspective view and rear perspective view of a stationary setup tool according to an embodiment.

In general, the magnetic element or magnetic elements in the moving element are intended to be mounted as appropriate for diversion to work reliably in either direction, with either moving element orientation, across all moving elements and diverters on the system. In this case, an embodiment of a stationary setup tool 700 intended for a moving element with two magnetic elements is shown in FIGS. 9A and 9B. This embodiment of the stationary setup tool is configured in a similar way as a portion of the track but is provided with a steel plate attached to a load cell 710 in a location where the linear motor would otherwise be mounted.

Figure 10:
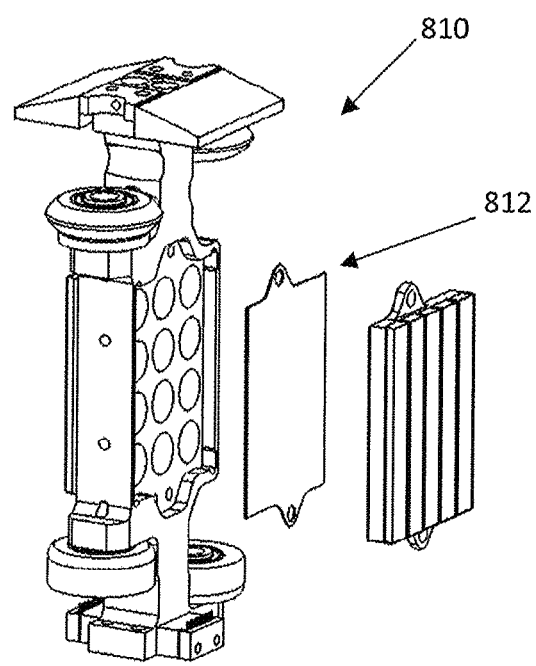
FIG. 10 illustrates an exploded view of a moving element showing a magnet positioning device according to an embodiment.

The stationary setup tool may be provided with rails that are similar to those on a track section so a moving element may be placed in front of the steel plate, which is intended to mimic the motor stator. The load cell measures the attractive force of the magnetic elements in the moving element and from this an offset may be calculated to adjust the magnetic elements within the moving element to a magnetically calibrated position using a magnet positioning 810 device such as that shown in FIG. 10. The magnet positioning device 810 may include one or more shims 812 (as shown in FIG. 10), a ground datum, set screws or the like, with the goal of positioning the magnetic element to achieve the appropriate force during movement and diversion. In some embodiments, there may be a magnet positioning device for each magnetic element on the moving element. After adjustment of the magnetic element on one side, the moving element may be flipped and the second magnetic element would be adjusted appropriately following the same procedure. The moving element will then be configured such that both magnetic elements are aligned based on magnet attractive force and manufacturing tolerances are no longer as critical. Again, this approach is also intended to assist with compensation for variability in magnet strength in the case where permanent magnets are used. All moving elements can be setup to provide an appropriate magnetic force for reliable diversion.

It is intended that the linear motor conveyor system provided herein may include flexible, high speed diverters that enables high volume production without processes having to follow a conventional assembly line order (i.e. allow for diversion through differing processes, in parallel or other processing formats).

Conventionally, assembly lines still generally follow very early concepts of serial processing (i.e. having one station after the other on a line, without diversion to other lines or processes). Conventional diverters exist but they are generally slow, take up significant space, require complex mechanical connections, have constraints where they can be located, have moving parts that wear and require maintenance and are costly. As noted herein, diverters for linear motor conveyors have been particularly difficult because of the forces involved and the need for mechanical tooling, actuators or the like. As a result of these constraints, conventional diverters are used to enhance the serial assembly line but they do not change the overall paradigm. For example, diverters may be used to route product to multiple stations doing the same process (partially parallel) and back to the main line which may all still be done in serial. Diverters may also be used to route defect product off a line and, after repair, the product can be routed back onto the line to continue from where it left off in the serial process. Current diverters add flexibility to the serial assembly line but have constraints that prevent organizing processes in alternate ways.

Figure 11A:
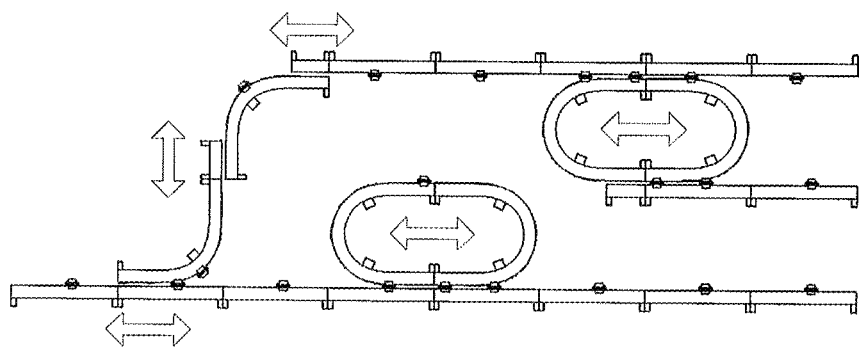
FIGS. 11A and 11B illustrate a top view and perspective view of a conveyor with divert according to an embodiment.
Figure 11B:
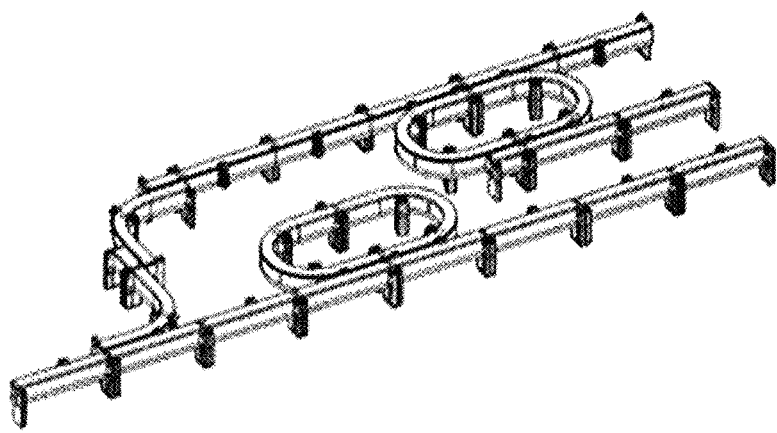
Figure 12A:
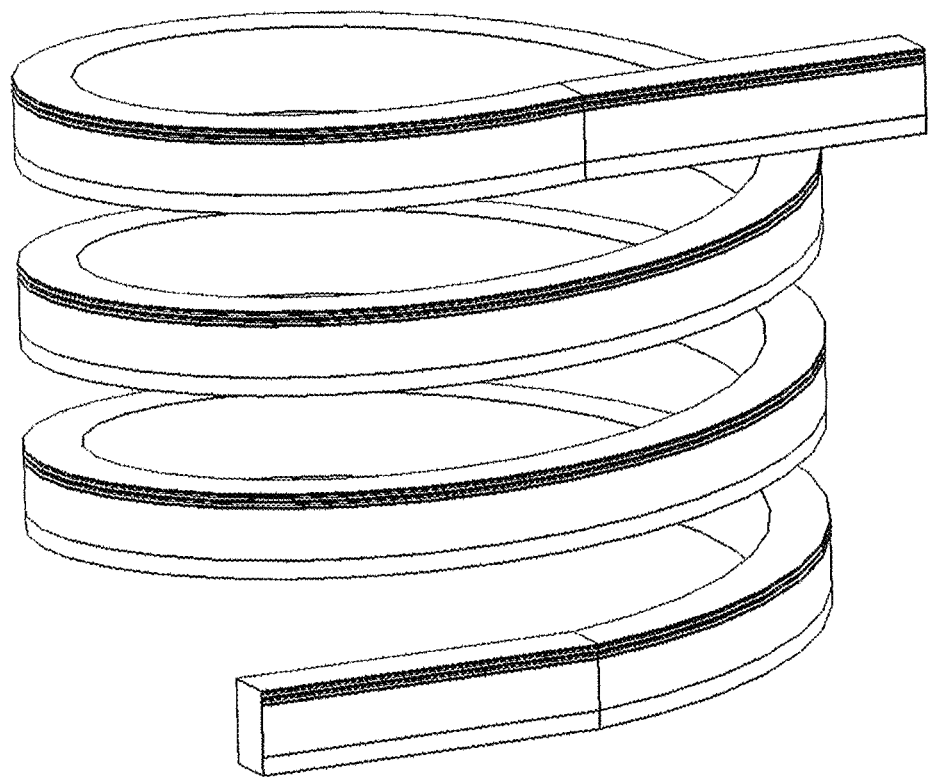
FIGS. 12A and 12B illustrate example embodiments of track sections for varying from one height to another.
Figure 12B:
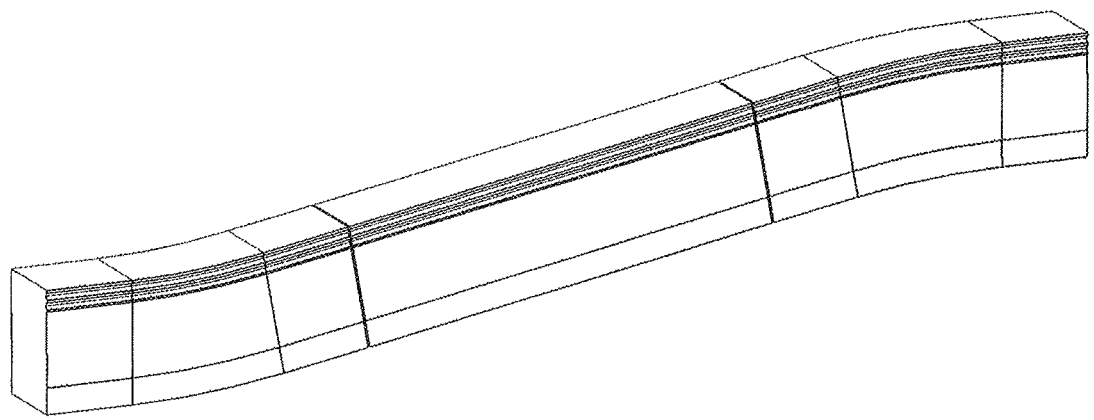

FIGS. 11A and 11B illustrate a conveyor system 400 which includes examples of diverters. The intention is to route moving elements on-the-fly at operating speeds so that the diverting will allow continuous flow of moving elements. In a manufacturing environment, it is intended that the diverters be highly reliable to handle many diversions per shift as a normal mode of operation. For example, in a typical manufacturing environment, the diverters may handle anywhere from 30 to 800 diversions per minute (or any value in between) under 24/7 operation which is equivalent to millions of diversions per week. The diverters are intended to be compact, cost effective, available to be added almost anywhere in the conveyor system, operate bidirectional, operate at programmable speed, and the like. It is intended that the control system for the conveyor system takes care of any complexities of traffic control. Conveyor systems using these diverters may be configured in flexible ways such that combinations of curves and straight track sections may be configured as needed for various applications. Ideally, the track sections are also modular and can be reused or reconnected again if there is a reconfiguration of the conveyor system. Large conveyor systems may also have regions or zones at different physical heights so the linear motor conveyor may also have elements allowing the conveyor system to adjust to varying heights. FIGS. 12A and 12B show example embodiments of conveyor tracks that move from one height to another.

It is intended that the divert allows the conveyor system to have curved track sections with integrated straight profiles which allows for diverts on the curved track section. Conventionally, linear motor conveyor systems have a curved track section and a short track section to enable divert which was intended to provide for greater versatility. It has been found though that having a separate short track section may be undesirable. It was noted that having a separate short track section required mechanical joints and transitions that may be hard to align and increase cost while reducing reliability. Curved sections with integrated straight profiles do not require extra joints which may improve the reliability. It was also noted that separate track sections may require separate controls and increase controller and wiring complexities. The divert system and method described herein are intended to provide for integrated curves which may reduce these additional complexities.

As indicated herein, it is intended that the divert operation be accomplished by varying the magnetic field to the moving element as it moves through a divert. As such, it is intended that no additional mechanical actuations are required for diversion, just magnetic field adjustment. As there are no mechanical actuations, the diversion is intended to be highly reliable over a very large number (possibly, many millions) of diversions in a normal mode of operation.

In the embodiments herein, the same magnetic elements, for example the motors/drive elements (and, in particular, the coils in the motors), may be used for both propulsion and diversion, which is intended to allow diversion to occur anywhere along the linear motor. Diversions are intended to occur at programmable speed and may be bidirectional for flexibility in configuring the conveyor system and track sections.

Further, since in the embodiments herein, standard linear motors can perform the diversion without additional coils, electronics or mechanical actuations, the solution is intended to be cost effective and compact.

As noted herein, the conveyor system and/or each divert location may include a controller which is intended to provide traffic control and prevents collisions. The controller may also be configured to attempt to avoid moving element lockups or the like, which may occur in a situation involving flexible, non-serial flow.

Figure 13:
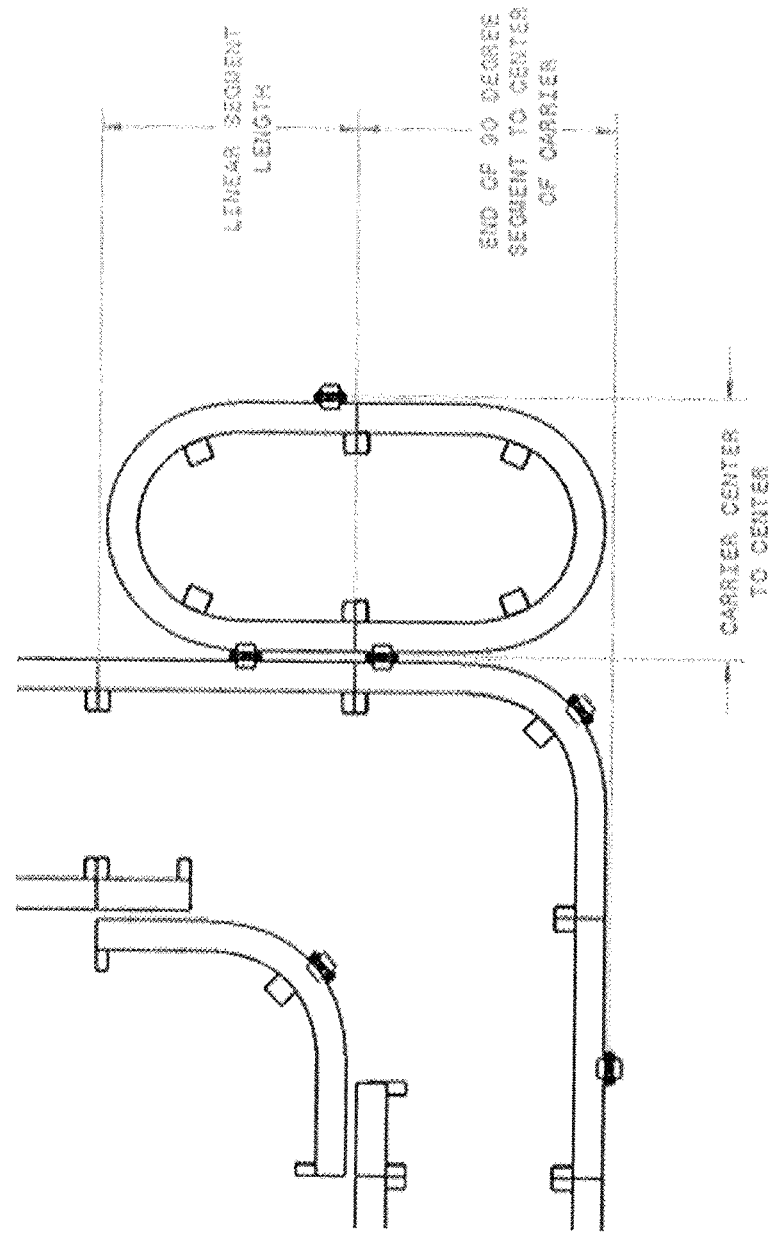
FIG. 13 illustrates a conveyor with divert.
Figure 14:
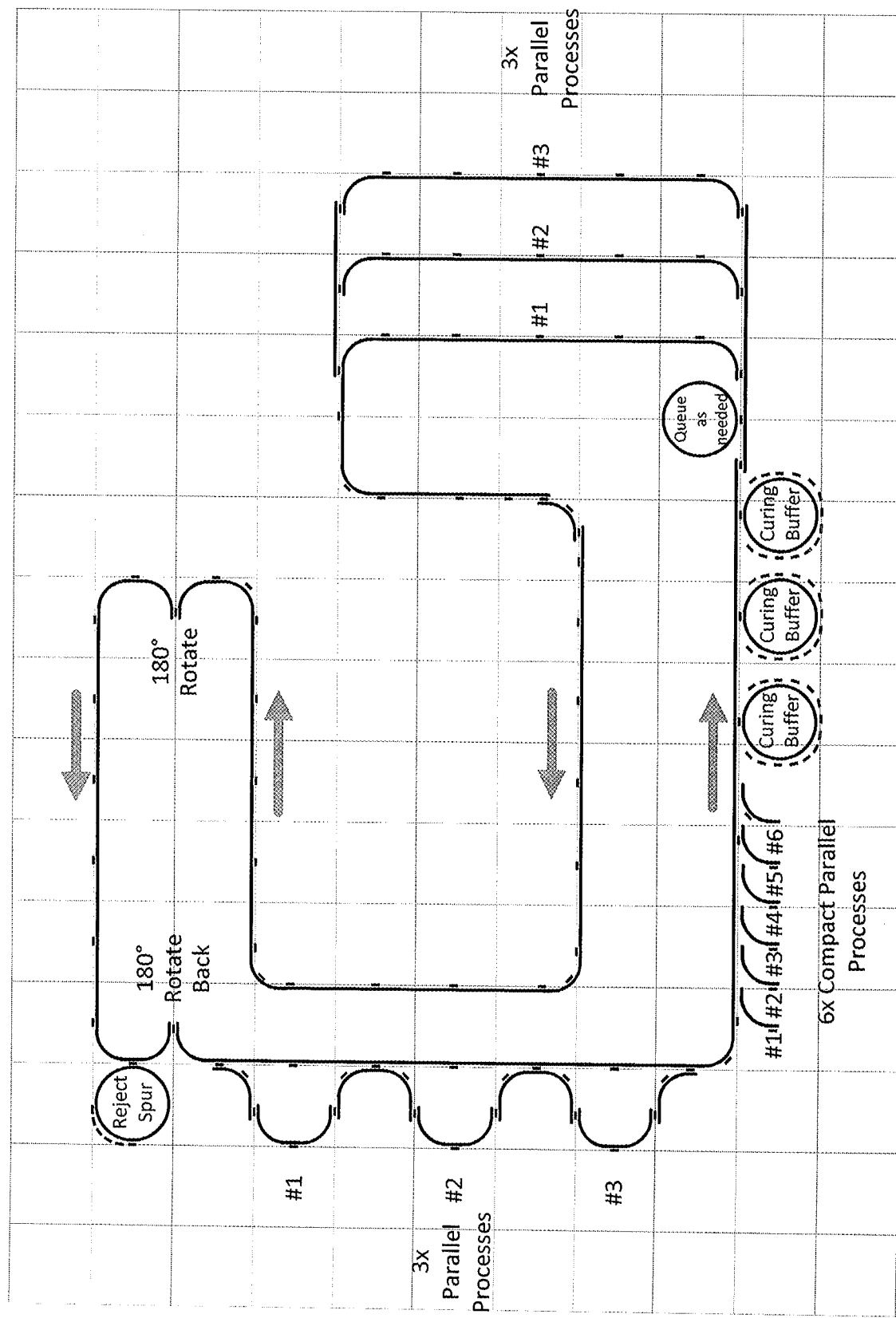
FIG. 14 illustrates an alternative embodiment of a conveyor with divert as arranged on a grid.

FIGS. 13 and 14 illustrate a method of designing conveyor systems that involves organizing standardized parts on a grid to allow conveyor systems to be configured in flexible ways using various combinations of curved and straight track sections. A conventional system of designing conveyor systems involves organizing the conveyor on a grid in which the center-line of the conveyor is on the grid. In the case of designing linear motor conveyors, this approach has generally been maintained. This has been problematic for linear motor conveyors that have the moving element on a side of the track as opposed to on top of the track (which is the configuration of many conventional conveyor systems). In an unexpected development, it was determined that, if the moving elements are placed/centered on the grid (as opposed to the track sections or other datum), conveyor systems can be designed that will be able to be connected and reconnected much more easily.

One of the benefits of designing with the moving element on the grid is modularity. In particular, a small series of building blocks can be made that allow systems to be put together of many different shapes and configurations. This modularity extends from the track itself, to other related elements including shrouding, table tops, table frames and outriggers, as well as guarding equipment that may be arranged around the conveyor system. With the moving elements on the grid, flexible shapes of the track can be defined and then the complete system, including guarding can be generated such that all components interconnect efficiently and accurately. If moving elements are not on grid, any design beyond that of a basic carousel, requires additional planning/design because of irregular geometry. In this situation, layout flexibility is constrained and all the table and guarding design must generally be carried out on a semi-custom basis, requiring many more unique parts.

As noted and shown herein, in some cases, the conveyor system may include zones of different heights. It may be beneficial to include various zones at different heights as this may allow for larger, multi-zone systems. In some cases, it should be possible to raise or lower moving elements on-the-fly without degrading throughput. It has been found that the use of a grid system with the moving elements on the grid lines allows for the more efficient design of multi-level conveyor systems.

In the embodiments herein, while the conveyor system is shown with the track in an upright or vertical orientation and the moving elements on the side, it will be understood that the conveyor system may be in any desired orientation while achieving at least one advantage described herein.

Figure 15A:
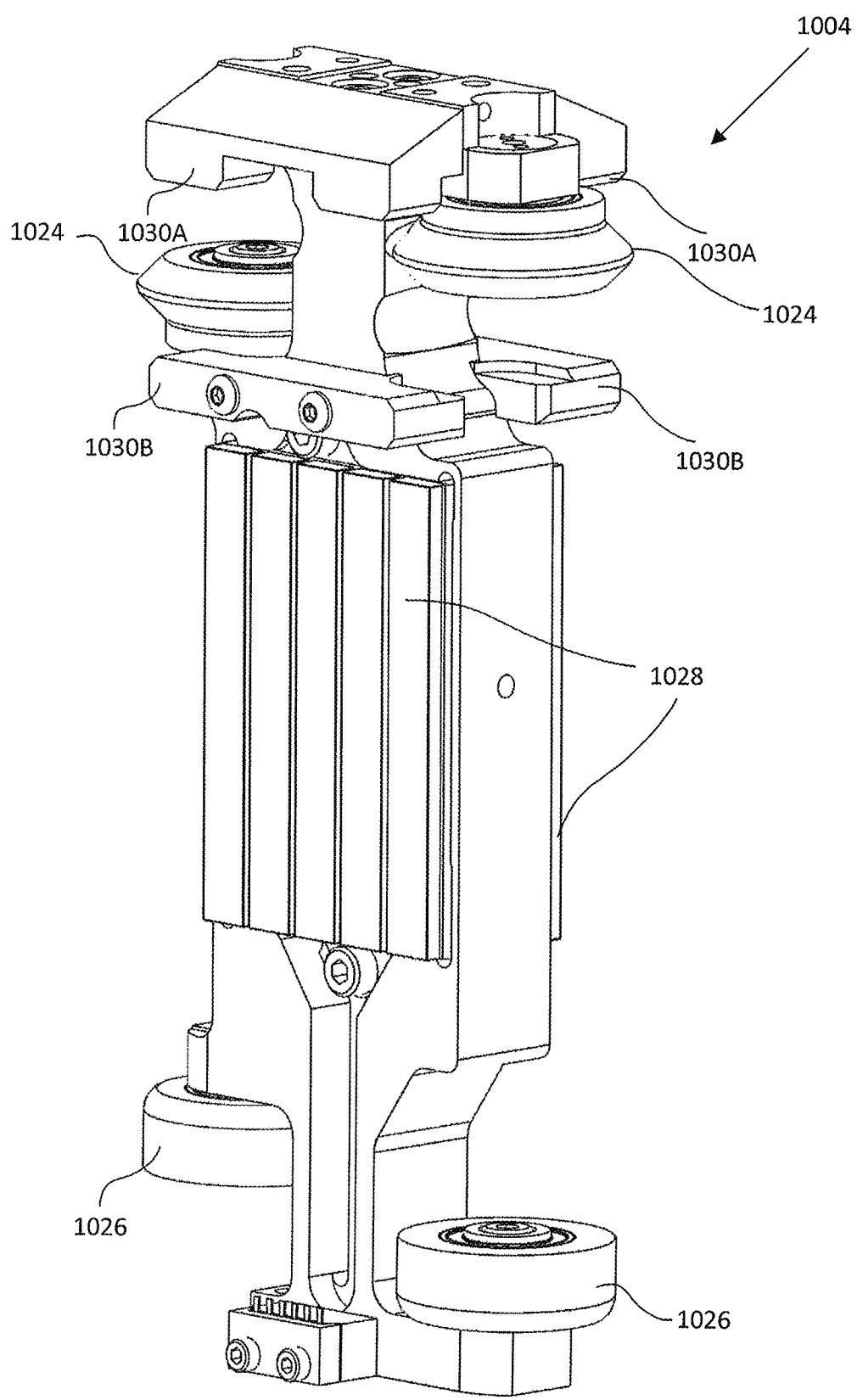
FIG. 15A illustrate another embodiment of a moving element.

FIG. 15A illustrates a moving element 1004 having a first set of bearings 1024 with a shaped profile, a second set of bearings 1026 with a flat profile, a body 1020, and two magnetic elements 1028 located on either side of the body 1020. During operation, there may be a desire to have further stabilization for the moving element 1004, especially when the load of the moving element 1004 is not centered. In some cases, one or more stabilizers 1030A and 1030B may be included on the moving element 1004. In this embodiment, the stabilizers 1030A and 1030B are spaced apart from the rails by a small gap, and only contact the rails if the pallet rotates off the track. In some cases, the stabilizer 1030 may be mechanical restraints that are intended to reduce rotation during a divert section. In some cases, mechanical restraint(s) may be additional bars located above and below the first set of bearings 1024 and configured to be proximate to the first guide rail of both the track section and divert section of the conveyor system, but may allow for a small gap between the stabilizers 1030 and the track and/or divert section. If the moving element 1004 experiences rotation during the diversion, the stabilizers 1030 are intended to abut against the surface of the track section and/or divert section to stabilize the moving element 1004. In some cases, stabilizers may be included only above or only below the first set of bearings 1024.

Figure 15B:
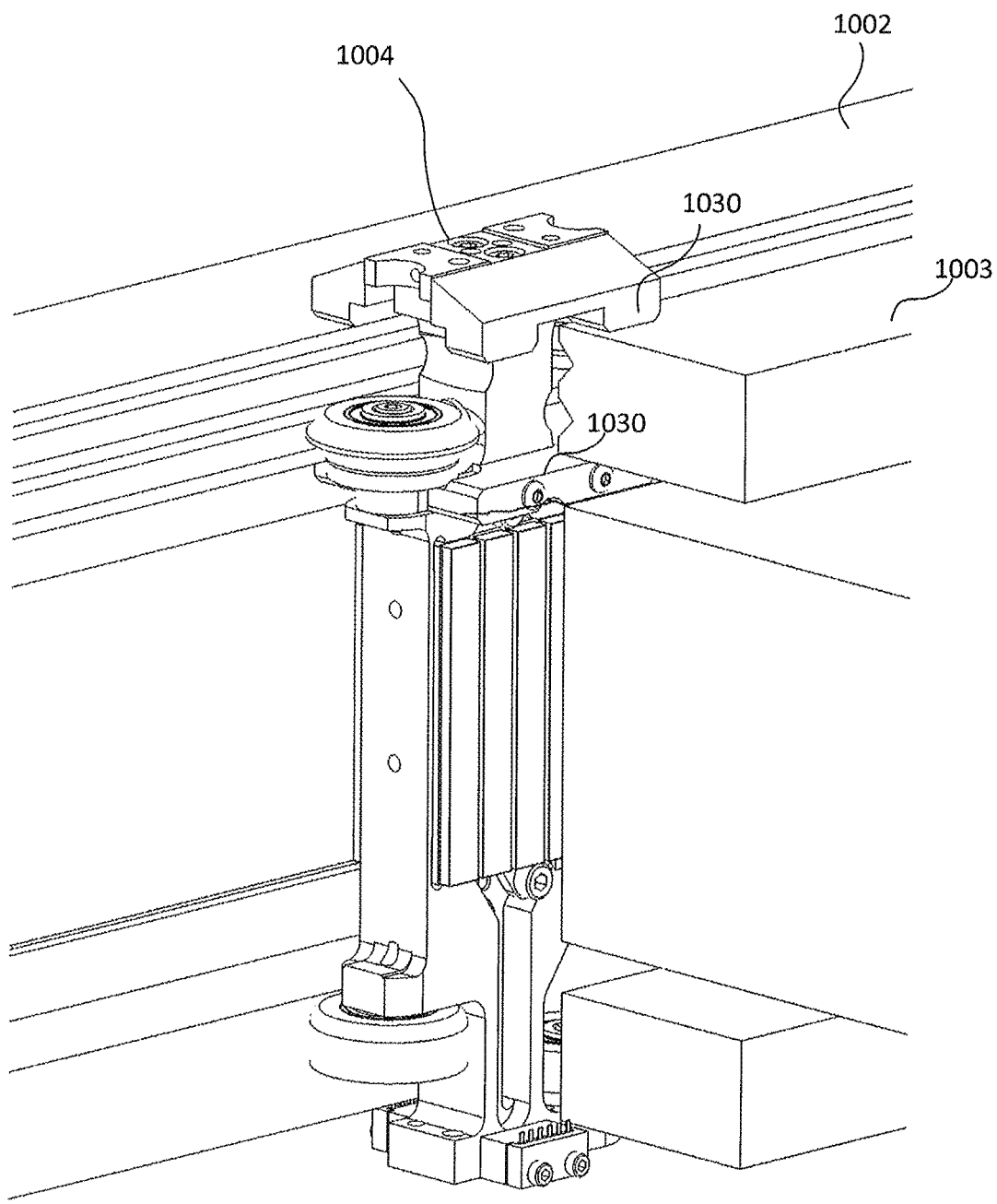
FIGS. 15B and 15C illustrate side and cross-sections of the moving element of FIG. 15A in association with a track section.
Figure 15C:
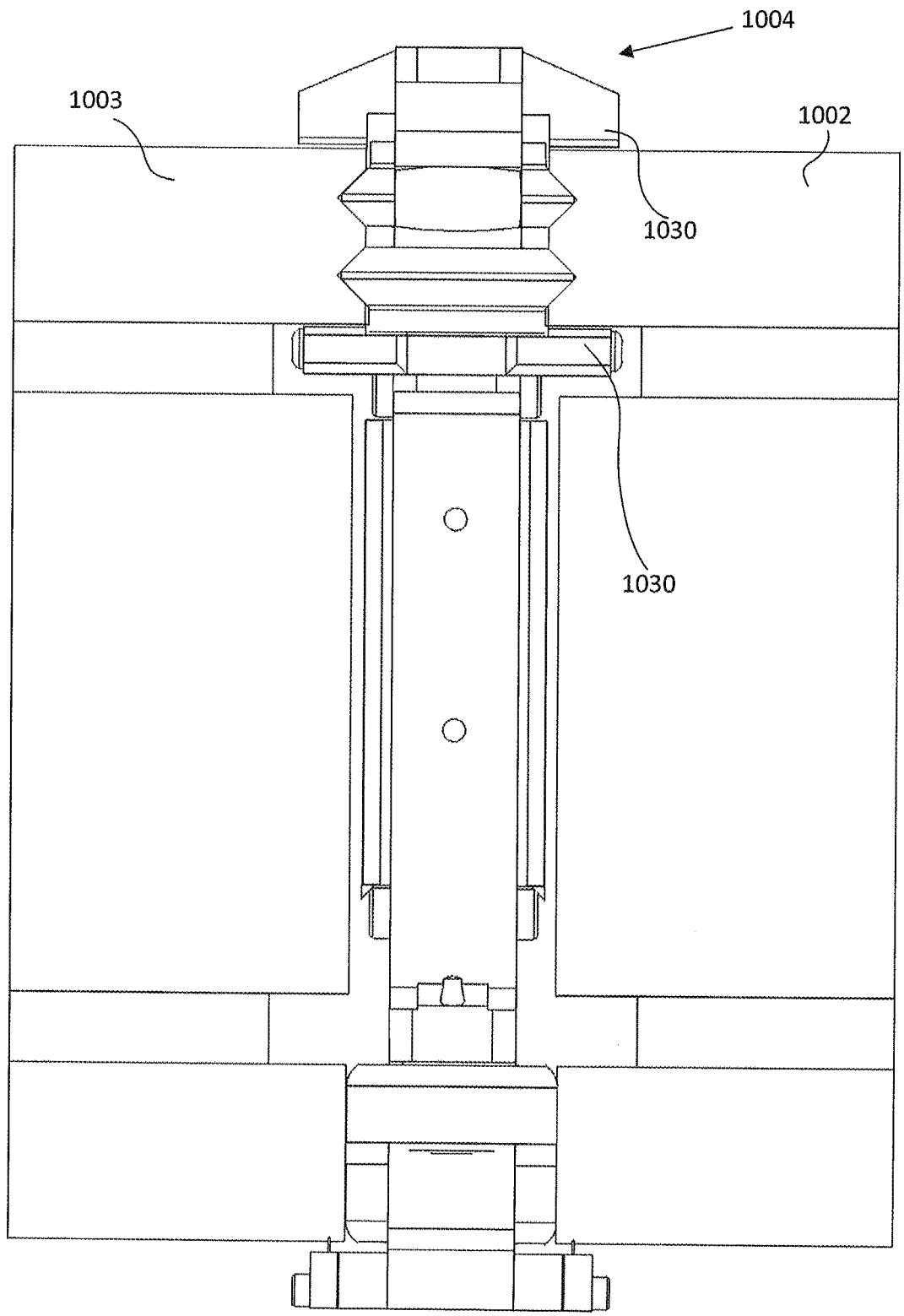

FIGS. 15B and 15C illustrate the moving element 1004 on a track section 1002 approaching a divert section 1003 and in between the track section 1002 and divert section 1003. Unlike conventional conveyor system that traditionally encapsulate the moving element throughout the moving elements travel, the linear conveyor system detailed herein encapsulates the moving element only during a divert section. It was determined that a stabilizer may be beneficial during the divert sections to reduce or eliminate rotation of the moving element as it is biased between the track section and the divert section.

Stabilizers can be useful in the diverter section because of reduced static lateral forces holding the moving element on the rail. Using the previous example, normally the pallet is suspended to the motor with approximately 200N lateral force. In the diverter region the lateral holding forces may be reduced to approximately 40N due to balancing of the static lateral force between the first and second guide rails. Without the stabilizers, the moving element could rotate more easily due to lower holding force. The possibility of tipping increases if there is acceleration or deceleration of the moving element, or if the payload on the moving element is off-center. Thus, the stabilizers may prevent or inhibit rotation throughout the diverter region, and can provide added safety during the actual diversion motion and as the pallet is moving through the diverter area. Typically the stabilizers do not make contact under normal operation and just make contact when an undesired rotation occurs.

Figure 16:
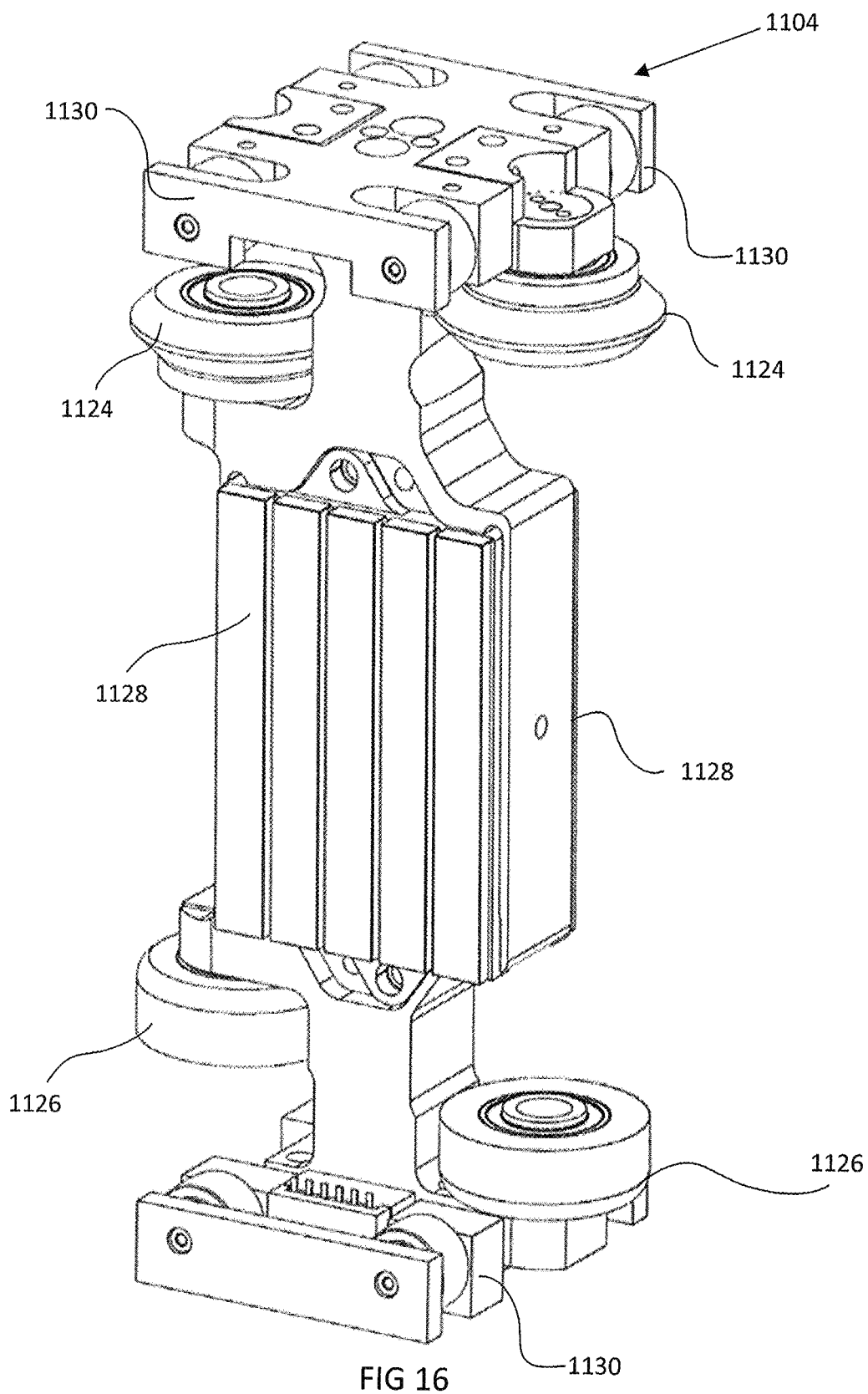
FIG. 16 illustrates yet another embodiment of a moving element.

FIG. 16 illustrates an alternative embodiment of a moving element 1104 having a first set of bearings 1124 with a shaped profile, a second set of bearings 1126 with a flat profile, a body 1120, two magnetic elements 1128 located on either side of the body 1120, and a stabilizer bearings 1130A and 1130B located at the top and the bottom of the moving element. In some cases, the stabilizers may only be located at the top, or only located at the bottom of the moving element. The bearing stabilizers 1130A include a plurality of wheels which are intended to provide support and greater stability to the moving element 1104 during the diversion from a provide support on the top surface of a first guide rail. The bottom bearings of the stabilizer are intended to provide support on the bottom surface of a second guide rail. During normal travel, the stabilizer bearings 1130 may be proximate but may not abut against either guide rail. The stabilizer bearings 1130 may be configured to make contact with either the first or second guide rail if the moving element 1104 experiences rotation and, if there is contact, it may generate less friction compared with the moving element 1004 in FIGS. 15A to 15C.

In the preceding description, for purposes of explanation, numerous details are set forth in order to provide a thorough understanding of the embodiments. However, it will be apparent to one skilled in the art that these specific details may not be required. In other instances, well-known structures are shown in block diagram form in order not to obscure the understanding. For example, specific details are not provided as to whether some of the embodiments described herein are implemented as a software routine running on a processor via a memory, hardware circuit, firmware, or a combination thereof.

The above-described embodiments are intended to be examples only. Alterations, modifications and variations can be effected to the particular embodiments by those of skill in the art without departing from the scope, which is defined solely by the claims appended hereto.

What is claimed is:

1. A linear motor conveyor system comprising:
   a moving element comprising a magnetic element arranged centrally within a body of the moving element;
   a first track comprising a first linear motor, the first linear motor configured to generate a dynamic magnetic field which acts on the magnetic element to provide both a first dynamic lateral force and a first dynamic longitudinal force on the moving element, wherein the first track comprises a first magnetic material which acts on the first magnetic element to provide a first static lateral force in addition to the first dynamic lateral force;
   a second track, with at least a transfer region of the second track positioned adjacent the first track, the second track configured to generate a magnetic field that, acts on the magnetic element to provide a second lateral force on the moving element; and
   a controller to control at least the first linear motor such that the first dynamic lateral force and the first static lateral force from the first linear motor and the second lateral force from the second track are configured to bias the moving element toward the first linear motor until the moving element reaches the transfer region, after which the first dynamic lateral force and second lateral force are selectively adjusted such that the second lateral force overcomes the first dynamic lateral force and the first static lateral force to bias the moving element toward the second track.

2. A linear motor conveyor system according to claim 1, wherein the second track comprises a second magnetic material which acts on the second magnetic element to provide a second static lateral force, and wherein the controller selectively adjusts the first dynamic lateral force to bias the moving element toward the first track or the second track by overcoming net static forces from the first and second static lateral forces.

3. A linear motor conveyor system according to claim 2, wherein the first static lateral force is set based on a first magnetic gap between the moving element and the first linear motor, and the second static lateral force is set based on a second magnetic gap between the moving element and the second linear motor.

4. A linear motor conveyor system according to claim 3, wherein the second track comprises at least one electromagnet and the first dynamic longitudinal force is configured to propel the moving element along the second track while held to the second track by the lateral forces of the at least one electromagnet.

5. A linear motor conveyor system comprising:
   a moving element comprising at least one magnetic element;
   a first track comprising a first linear motor, the first linear motor configured to have a first predetermined magnetic gap between the first linear motor and the moving element to bias the moving element toward the first linear motor;
   a second track having a transfer region positioned adjacent, the first track such that the moving element has a second predetermined magnetic gap between the second track and the moving element; and
   a controller to control the first linear motor such that, in the transfer region, the first linear motor can be selectively adjusted to generate a lateral magnetic force that, in combination with the second predetermined magnetic gap, overcomes the first predetermined magnetic gap and biases the moving element towards the second track.

6. A linear motor conveyor system according to claim 5, wherein the second predetermined magnetic gap is different from the first predetermined magnetic gap.

7. A linear motor conveyor system according to claim 5, wherein the moving element comprises a first magnetic element on a first side and a second magnetic element on a second side, opposite to the first side.

8. A linear motor conveyor system according to claim 7, wherein the second track comprises at least one electromagnet and the first dynamic longitudinal force is configured to propel the moving element along the second track while held to the second track by the lateral forces of the electromagnet.

9. A moving element for a linear motor conveyor system, the moving element comprising:
   at least one magnetic element having a magnetically calibrated position in relation to the moving element and configured to interact with both a magnetic field associated with a first track and a magnetic field associated with a second track to bias the moving element towards the second track when the magnetic field associated with the second track overcomes the magnetic field associated with the first track.

10. A moving element according to claim 9, further comprising:
a magnet positioning device for adjusting position of the magnetic element in relation to the moving element.

11. A moving element according to claim 9, wherein the at least one magnetic element comprises a first magnetic element on a first side and a second magnetic element on a second side, opposite to the first side.

12. A moving element according to claim 9, further comprising a stabilizer configured to reduce rotation of the moving element.

13. A moving element according to claim 9, further comprising at least one cover for the at least one magnetic element to shield the magnetic field.

14. A method of configuring a diverter on a linear motor conveyor system wherein the linear motor conveyor system comprises a first track and a second track adjacent each other with a predetermined distance therebetween, the method comprising:
determining, via a controller, the magnetic forces on a setup tool placed between the adjacent first and second tracks; and
adjusting a magnetic set point for each of the first and second tracks based on the determined magnetic forces to allow a moving element to be diverted from the first track to the second track when a magnetic force associated with the second track overcomes a magnetic field generated by the linear motor of the first track.

15. A method of designing a linear motor conveyor system, the method comprising:
receiving the dimensions of at least a straight section and an orthogonal section of track;
creating, via a controller, a grid based on the determined dimensions, the grid including grid lines; and
configuring the linear motor conveyor system on the grid such that the moving elements are placed on the grid lines.

16. A method of designing a linear motor conveyor system according to claim 15, further comprising determining, via a controller, dimensions of a 180-degree curved section that fits on the grid.

* * * * *